(12) United States Patent
Nakamura et al.

(10) Patent No.: US 11,336,803 B2
(45) Date of Patent: May 17, 2022

(54) INFORMATION PROCESSING APPARATUS, INFORMATION PROCESSING METHOD, PROGRAM, AND INTERCHANGEABLE LENS

(71) Applicant: SONY CORPORATION, Tokyo (JP)

(72) Inventors: Makibi Nakamura, Tokyo (JP); Kengo Hayasaka, Kanagawa (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 29 days.

(21) Appl. No.: 16/959,820

(22) PCT Filed: Dec. 28, 2018

(86) PCT No.: PCT/JP2018/048420
§ 371 (c)(1),
(2) Date: Jul. 2, 2020

(87) PCT Pub. No.: WO2019/138925
PCT Pub. Date: Jul. 18, 2019

(65) Prior Publication Data
US 2020/0374423 A1      Nov. 26, 2020

(30) Foreign Application Priority Data

Jan. 11, 2018   (JP) .............................. JP2018-002322

(51) Int. Cl.
  *H04N 5/217*    (2011.01)
  *G03B 17/14*    (2021.01)
  *H04N 5/208*    (2006.01)
(52) U.S. Cl.
  CPC ............. *H04N 5/217* (2013.01); *G03B 17/14* (2013.01); *H04N 5/208* (2013.01); *G03B 2206/00* (2013.01)

(58) Field of Classification Search
  CPC ...................................................... H04N 5/217
  (Continued)

(56) References Cited

U.S. PATENT DOCUMENTS

2013/0038751 A1*   2/2013   Kurahashi ............ H04N 13/218
                                                      348/222.1
2013/0135449 A1    5/2013   Horii

FOREIGN PATENT DOCUMENTS

CN        101971610 A      2/2011
CN        107147858 A      9/2017
(Continued)

*Primary Examiner* — Joel W Fosselman
(74) *Attorney, Agent, or Firm* — Paratus Law Group, PLLC

(57) ABSTRACT

There is provided an information processing apparatus, an information processing method, a program, and an interchangeable lens each capable of appropriately correcting shading of an image having a plurality of viewpoints. A communication unit receives shading information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor. A correction unit corrects shading of each of the plurality of ommatidium images that are included in the captured image acquired by the image sensor and respectively correspond to the plurality of ommatidium lenses on the basis of the shading information. For example, the present technology is applicable to a camera system or the like which captures an image.

7 Claims, 25 Drawing Sheets

(58) Field of Classification Search
USPC .......................................................... 348/241
See application file for complete search history.

(56) References Cited

FOREIGN PATENT DOCUMENTS

| | | |
|---|---|---|
| JP | 2000-196953 A | 7/2000 |
| JP | 2002-131623 A | 5/2002 |
| JP | 3539394 B2 | 7/2004 |
| JP | 2010-039759 A | 2/2010 |
| JP | 2011-247965 A | 12/2011 |
| JP | 2013-038751 A | 2/2013 |
| WO | WO 2012/111220 A1 | 8/2012 |

* cited by examiner

FIG. 26
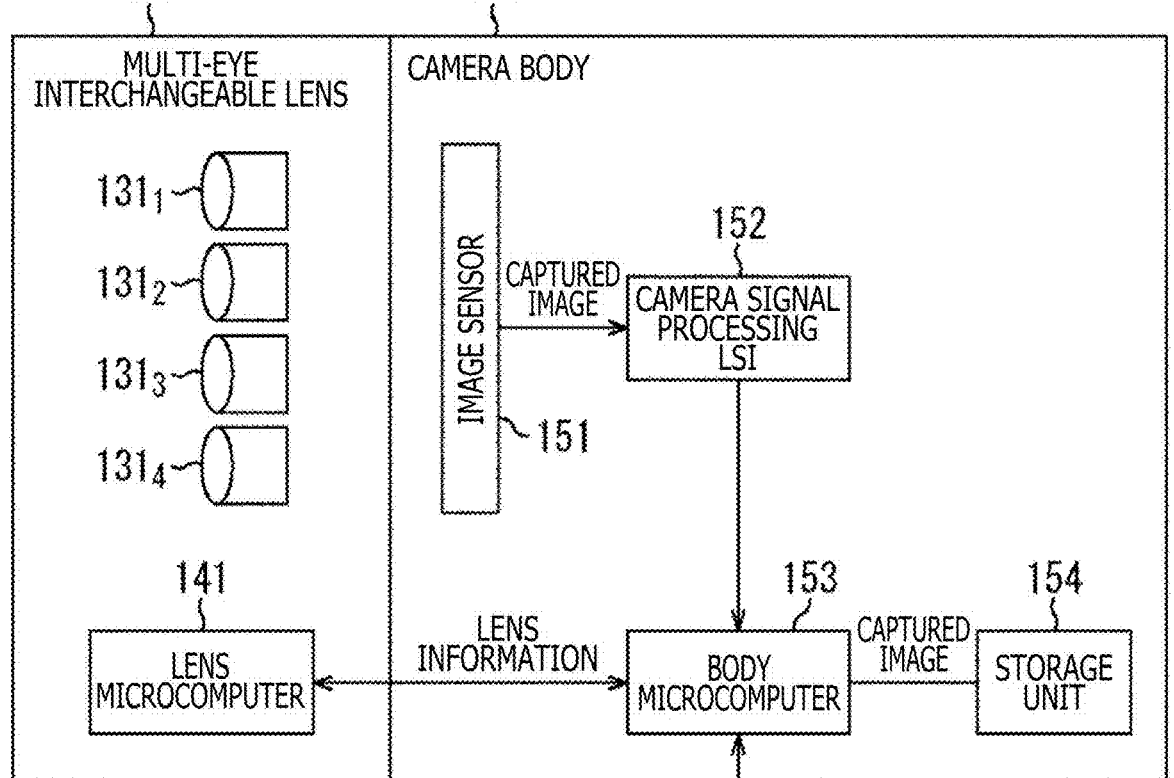
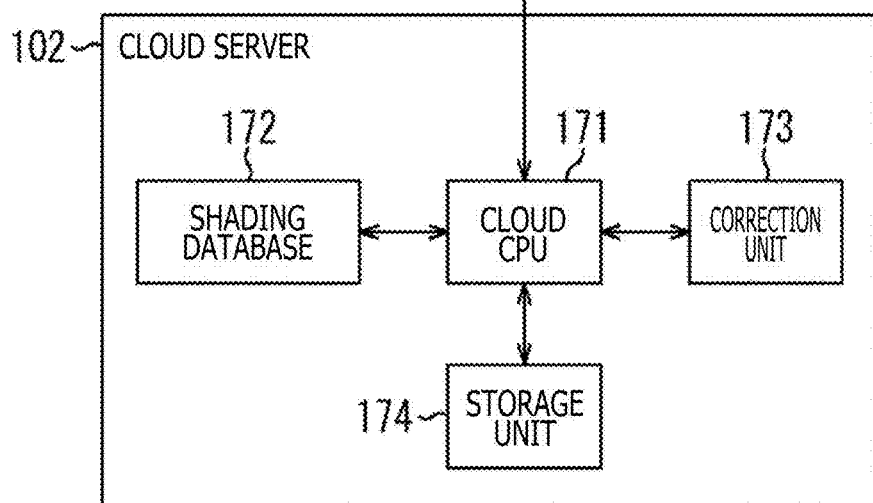

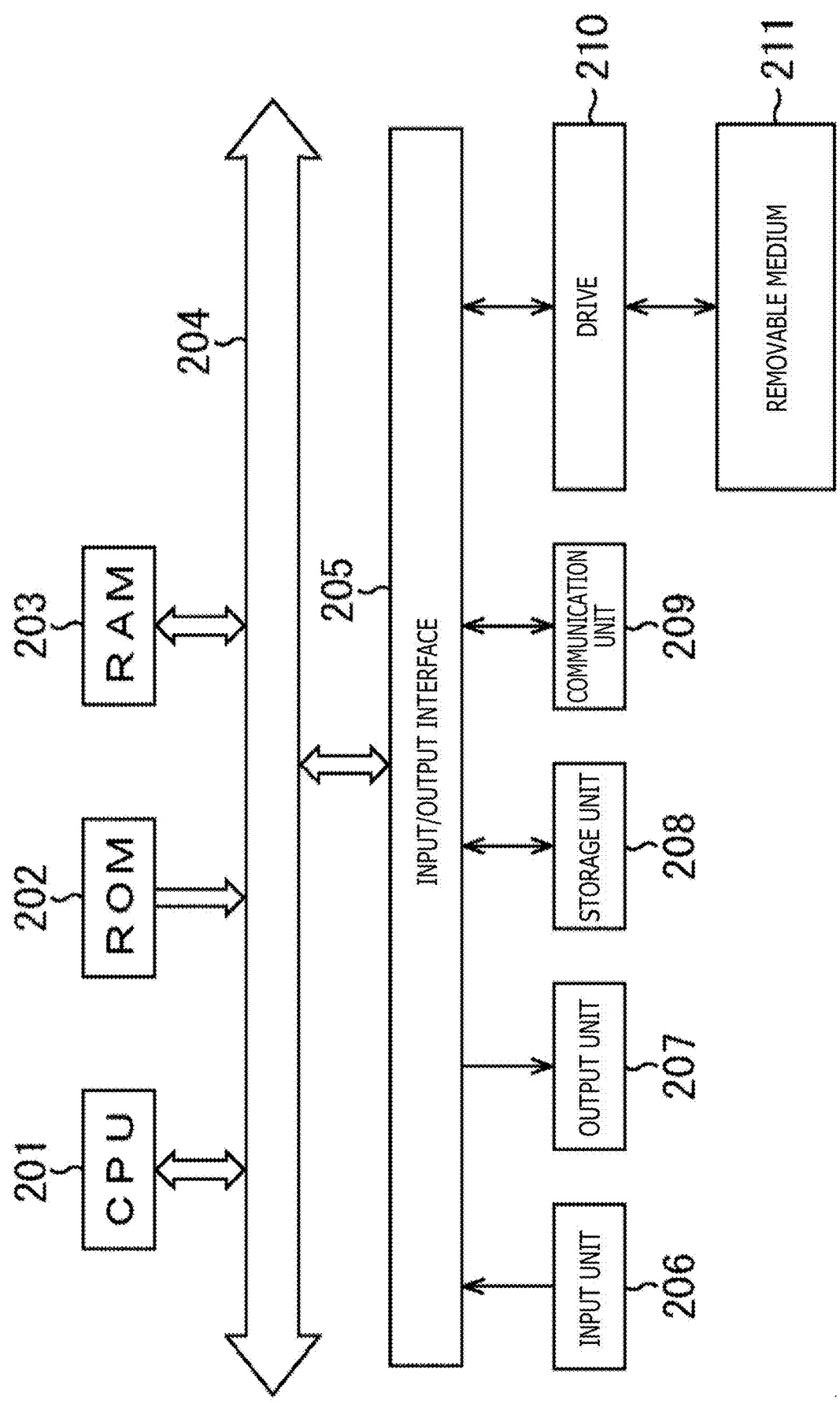

INFORMATION PROCESSING APPARATUS, INFORMATION PROCESSING METHOD, PROGRAM, AND INTERCHANGEABLE LENS

CROSS REFERENCE TO PRIOR APPLICATION

This application is a National Stage Patent Application of PCT International Patent Application No. PCT/JP2018/048420 (filed on Dec. 28, 2018) under 35 U.S.C. § 371, which claims priority to Japanese Patent Application No. 2018-002322 (filed on Jan. 11, 2018), which are all hereby incorporated by reference in their entirety.

TECHNICAL FIELD

The present technology relates to an information processing apparatus, an information processing method, a program, and an interchangeable lens, and particularly to an information processing apparatus, an information processing method, a program, and an interchangeable lens each capable of appropriately correcting shading of an image having a plurality of viewpoints, for example.

BACKGROUND ART

For example, PTL 1 describes an image processing apparatus which synthesizes images while considering an effect of shading.

CITATION LIST

Patent Literature

[PTL 1]
Japanese Patent No. 3539394

SUMMARY

Technical Problem

For performing particular image processing such as refocusing, an image having a plurality of viewpoints needs to be captured.

Generally, shading is caused during image capturing. Accordingly, shading is similarly caused in a case where an image having a plurality of viewpoints is captured. It is therefore necessary to appropriately correct shading of an image having a plurality of viewpoints.

The present technology has been developed in consideration of such circumstances, and is capable of appropriately correcting shading of an image having a plurality of viewpoints.

Solution to Problem

An information processing apparatus or a program according to the present technology are directed to an information processing apparatus, or a program under which a computer functions as an information processing apparatus. The information processing apparatus includes a communication unit that receives shading information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor, and a correction unit that corrects shading of each of the plurality of ommatidium images that are included in the captured image acquired by the image sensor and respectively correspond to the plurality of ommatidium lenses on the basis of the shading information.

An information processing method according to the present technology is directed to an information processing method performed by an information processing apparatus. The information processing method includes receiving shading information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor, and correcting shading of each of the plurality of ommatidium images that are included in the captured image acquired by the image sensor and respectively correspond to the plurality of ommatidium lenses on the basis of the shading information.

According to the information processing apparatus, the information processing method, and the program of the present technology, shading information is received as information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor. In addition, shading of each of the plurality of ommatidium images that are included in the captured image acquired by the image sensor and respectively correspond to the plurality of ommatidium lenses is corrected on the basis of the shading information.

An interchangeable lens according to the present technology is an interchangeable lens that includes ommatidium lenses that are a plurality of lenses so disposed as not to overlap with each other in an optical axis direction, a storage unit that stores shading information associated with shading of each of a plurality of ommatidium images that are included in a captured image acquired by one image sensor and correspond to images formed by lights respectively concentrated by the plurality of ommatidium lenses at a time of fitting to a camera body including the image sensor, and a communication unit that transmits the shading information to an outside.

According to the interchangeable lens of the present technology, ommatidium lenses that are a plurality of lenses so disposed as not to overlap with each other in an optical axis direction are provided. Shading information is stored as information associated with shading of each of a plurality of ommatidium images that are included in a captured image acquired by one image sensor and correspond to images formed by lights respectively concentrated by the plurality of ommatidium lenses at a time of fitting to a camera body including the image sensor. The shading information is transmitted to an outside.

Note that the information processing apparatus may be either an independent apparatus, or an internal block constituting one apparatus.

In addition, the program is allowed to be provided as a program transmitted via a transmission medium, or as a program recorded in a recording medium.

Advantageous Effect of Invention

According to the present technology, shading of an image having a plurality of viewpoints can appropriately be corrected.

Note that advantageous effects to be offered are not necessarily limited to the advantageous effect described herein, and may be any advantageous effects described in the present disclosure.

BRIEF DESCRIPTION OF DRAWINGS

FIG. 26 is a block diagram depicting a configuration example of a shading correction system in a case where shading correction is performed in a cloud.

FIG. 27 is a block diagram depicting a configuration example of a computer according to one embodiment to which the present technology is applied.

DESCRIPTION OF EMBODIMENTS

<Camera System of One Embodiment to which Present Technology is Applied>

Figure 1:
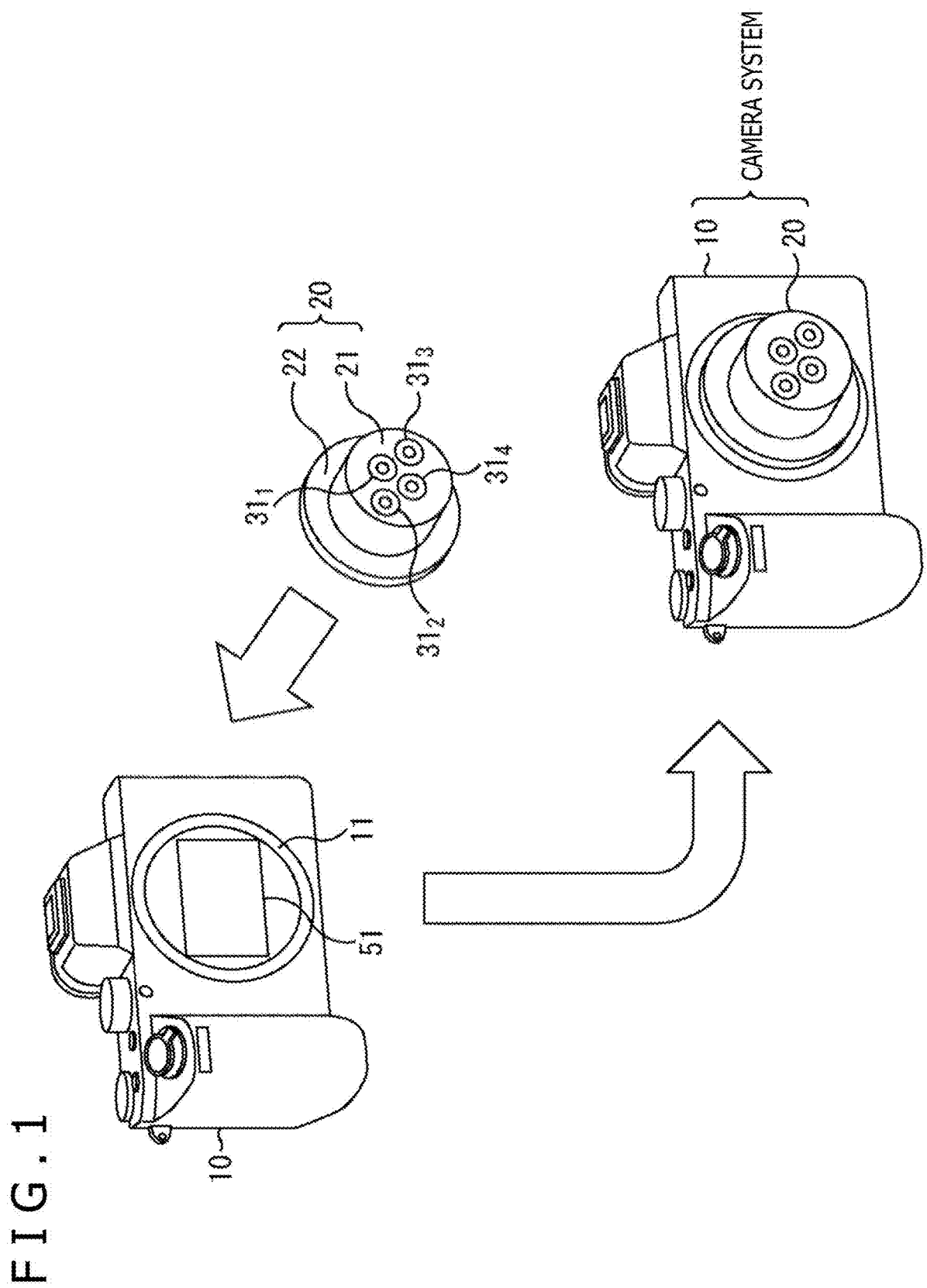
FIG. 1 is a perspective view depicting a configuration example of a camera system according to one embodiment to which the present technology is applied.

FIG. 1 is a perspective view depicting a configuration example of a camera system according to one embodiment to which the present technology is applied.

The camera system includes a camera body 10 and a multi-eye interchangeable lens 20.

The camera body 10 is configured such that the multi-eye interchangeable lens 20 is attachable to and detachable from the camera body 10. More specifically, the camera body 10 has a camera mount 11, and the multi-eye interchangeable lens 20 is fitted to the camera body 10 by attaching (a lens mount 22 of) the multi-eye interchangeable lens 20 to the camera mount 11. Note that an ordinary interchangeable lens other than the multi-eye interchangeable lens 20 is also allowed to be attached to and detached from the camera body 10.

The camera body 10 includes an image sensor 51 as a built-in component. For example, the image sensor 51 is a CMOS (Complementary Metal Oxide Semiconductor) image sensor, and captures an image by receiving light concentrated by the multi-eye interchangeable lens 20 or other types of interchangeable lens fitted to (the camera mount 11) of the camera body 10, and performing photoelectric conversion of the light. An image captured by the image sensor 51 will be hereinafter also referred to as a captured image.

The multi-eye interchangeable lens 20 includes a lens barrel 21 and the lens mount 22.

The lens barrel 21 includes four ommatidium lenses $31_1$, $31_2$, $31_3$, and $31_4$ which are a plurality of lenses so disposed as not to overlap with each other (as viewed) in an optical axis direction. In FIG. 1, the four ommatidium lenses $31_1$ to $31_4$ are disposed on the lens barrel 21 at four positions corresponding to vertexes of a rhombus on a two-dimensional plane orthogonal to an optical axis (parallel to a light receiving surface (imaging surface) of the image sensor 51).

Each of the ommatidium lenses $31_1$ to $31_4$ receives light from an object and concentrates the light on the image sensor 51 of the camera body 10 when the multi-eye interchangeable lens 20 is fitted to the camera body 10.

In addition, while the camera body 10 here is what is generally called a single panel camera including the one image sensor 51, what is generally called a s three-panel camera including a plurality of image sensors, i.e., three image sensors for respective colors of RGB (Red, Green, Blue), for example, is adoptable as the camera body 10. According to the three-panel camera, lights concentrated by the ommatidium lenses $31_1$ to $31_4$ are applied to each of the three image sensors via a not-depicted optical system.

The lens mount 22 is attached to the camera mount 11 of the camera body 10 when the multi-eye interchangeable lens 20 is fitted to the camera body 10.

In addition, while the four ommatidium lenses $31_1$ to $31_4$ are provided on the multi-eye interchangeable lens 20 in FIG. 1, the number of the ommatidium lenses provided on the multi-eye interchangeable lens 20 is not limited to four. The plurality of ommatidium lenses, i.e., two, three, five, or any number more than five of ommatidium lenses are allowed to be provided.

Moreover, the plurality of ommatidium lenses provided on the multi-eye interchangeable lens 20 are allowed to be disposed at any positions on a two-dimensional plane as well as positions corresponding to vertexes of a rhombus.

Furthermore, a plurality of lenses having different specifications, such as different focal lengths and F values, are adoptable as the plurality of ommatidium lenses provided on the multi-eye interchangeable lens 20. However, it is assumed here that a plurality of lenses having the same specifications are adopted for simplifying the description.

Each of the four ommatidium lenses $31_1$ to $31_4$ as the plurality of ommatidium lenses provided on the multi-eye interchangeable lens 20 is disposed at such a position that an optical axis of the ommatidium lens becomes orthogonal to the light receiving surface of the image sensor 51 when the multi-eye interchangeable lens 20 is fitted to the camera body 10.

According to the camera system where the multi-eye interchangeable lens 20 thus configured is fitted to the camera body 10, the image sensor 51 captures an image (captured image) corresponding to images formed on the light receiving surface of the image sensor 51 by respective lights concentrated by the four ommatidium lenses $31_1$ to $31_4$.

Suppose here that an image corresponding to an image formed by light concentrated by the one ommatidium lens $31i$ (i=1, 2, 3, or 4 here) is referred to as an ommatidium image, a captured image acquired by the one image sensor 51 includes four ommatidium images corresponding to the four respective ommatidium lenses $31_1$ to $31_4$ (images corresponding to the images formed by the lights concentrated the respective ommatidium lenses $31_1$ to $31_4$).

The ommatidium image corresponding to the ommatidium lens $31_1$ is an image which has a viewpoint corresponding to the position of the ommatidium lens $31_i$. Accordingly, the four ommatidium images corresponding to the respective ommatidium lenses $31_1$ to $31_4$ are images having different viewpoints.

Figure 2:
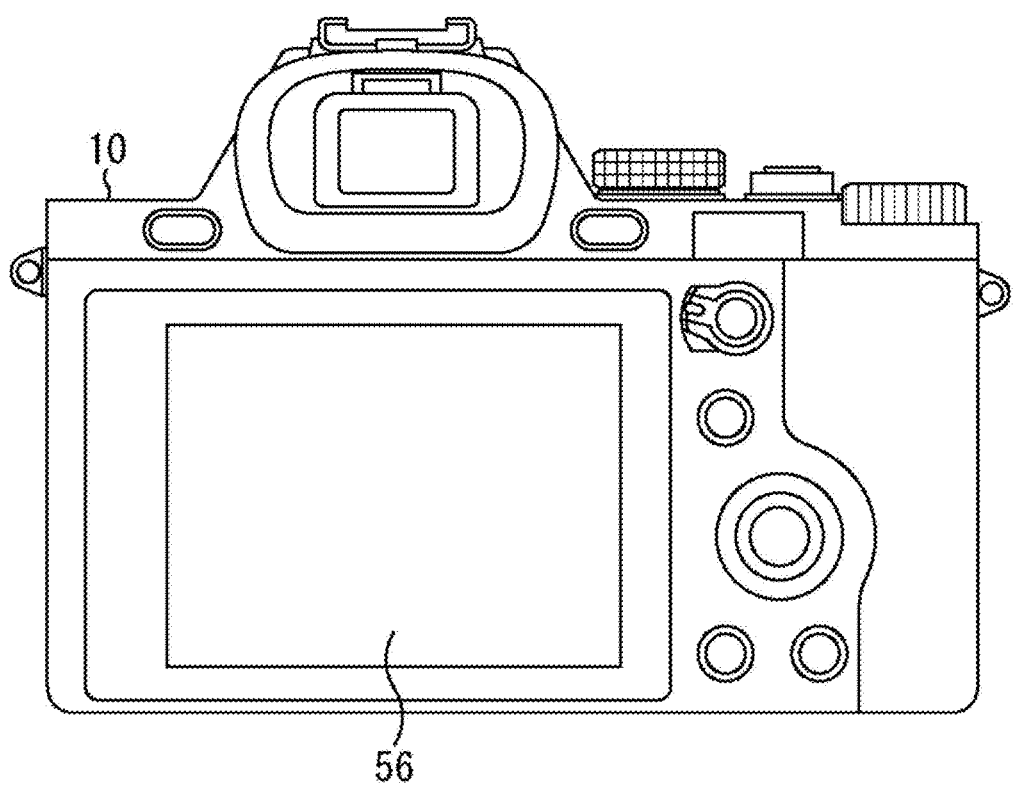
FIG. 2 is a rear view depicting a configuration example of a rear surface of a camera body 10.

FIG. 2 is a rear view depicting a configuration example of a rear surface of the camera body 10.

It is assumed here that a surface of the camera body 10 on the side where the multi-eye interchangeable lens 20 is fitted, i.e., a surface where the camera mount 11 is disposed, is a front surface.

For example, a display unit 56 including a liquid panel, an organic EL (Electro Luminescence) panel, or the like is provided on the rear surface of the camera body 10. What is generally called through images, menus, and information such as settings of the camera body 10 are displayed on the display unit 56.

Figure 3:
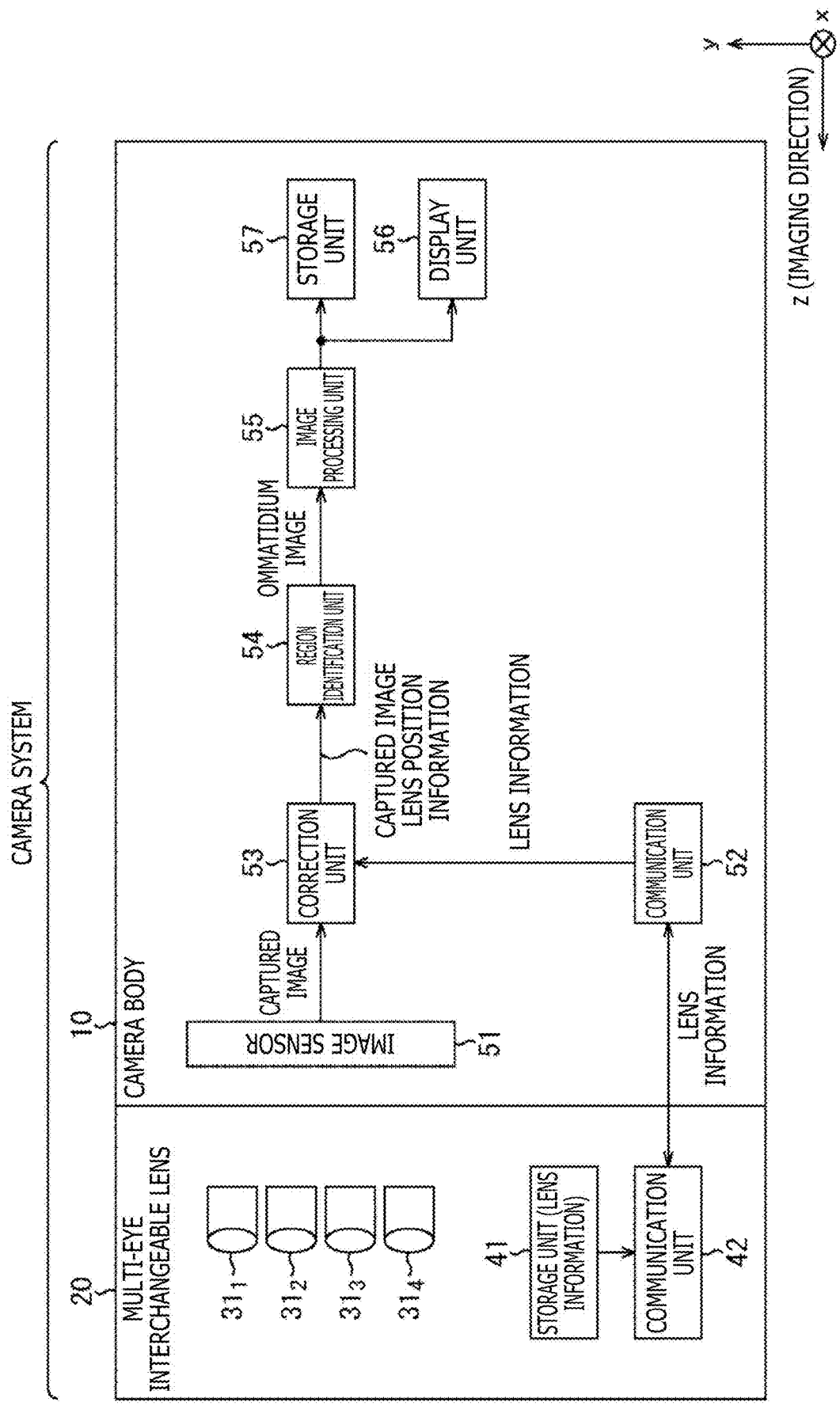
FIG. 3 is a block diagram depicting an electric configuration example of the camera system.

FIG. 3 is a block diagram depicting an electric configuration example of the camera system in FIG. 1.

The multi-eye interchangeable lens 20 of the camera system includes a storage unit 41 and a communication unit 42. For example, each of the storage unit 41 and the communication unit 42 is allowed to include a microcomputer (microcontroller).

The storage unit 41 stores lens information which is information associated with the multi-eye interchangeable lens 20. The lens information includes shading information associated with shading of each of ommatidium images corresponding to the ommatidium lenses $31_1$ to $31_4$ and included in a captured image acquired by the (one) image sensor 51 when the multi-eye interchangeable lens 20 is fitted to the camera body 10.

For example, the shading information includes lens position information, lens shading information, exit pupil position information, and exit pupil diameter information.

The lens position information is information indicating respective positions of the plurality of ommatidium lenses $31_1$ to $31_4$ included in the multi-eye interchangeable lens 20. The lens shading information is information associated with lens shading which is shading caused by each of the plurality of ommatidium lenses $31_1$ to $31_4$ included in the multi-eye interchangeable lens 20. The exit pupil position information is information indicating respective exit pupil positions of the plurality of ommatidium lenses $31_1$ to $31_4$ included in the multi-eye interchangeable lens 20. The exit pupil diameter information is information indicating respective exit pupil diameters of the plurality of ommatidium lenses $31_1$ to $31_4$ included in the multi-eye interchangeable lens 20.

In addition, adoptable as the shading information is information associated with shading of each of the ommatidium images included in the captured image other than the lens position information, the lens shading information, the exit pupil position information, and the exit pupil diameter information. For example, adoptable as the shading information is a lens ID (IDentification) of the multi-eye interchangeable lens 20 in a case where a unique lens ID is allocated to the multi-eye interchangeable lens 20, and in a case where a database is prepared in which the lens ID is associated with lens position information, lens shading information, exit pupil position information, and exit pupil diameter information corresponding to each of the ommatidium lenses $31_i$ of the multi-eye interchangeable lens 20 identified by the corresponding lens ID. In this case, the lens position information, the lens shading information, the exit pupil position information, and the exit pupil diameter information corresponding to each of the ommatidium lenses $31_i$ of the multi-eye interchangeable lens 20 associated with the lens ID can be acquired by searching the corresponding lens ID as a keyword in the database.

The communication unit 42 performs wired or wireless communication (body lens communication) with a communication unit 52 (described below) of the camera body 10. Note that the communication unit 42 is also allowed to be so configured as to communicate with a server in the Internet, a PC (Personal Computer) in a wired or wireless LAN (Local Area Network), or other external devices as necessary by using any communication system.

For example, the communication unit 42 transmits lens information stored in the storage unit 41 to the communication unit 52 of the camera body 10 by communicating with the communication unit 52 when the multi-eye interchangeable lens 20 is fitted to the camera body 10.

The camera body 10 includes the image sensor 51, the communication unit 52, a correction unit 53, a region identification unit 54, an image processing unit 55, the display unit 56, and a storage unit 57. For example, the communication unit 52, and further the correction unit 53 and the region identification unit 54 are each allowed to include a microcomputer (microcontroller).

For example, the image sensor 51 is a CMOS image sensor as described with reference to FIG. 1. Lights concentrated by the respective ommatidium lenses $31_1$ to $31_4$ of the multi-eye interchangeable lens 20 fitted to the camera body 10 are applied to the light receiving surface of the image sensor 51.

The image sensor 51 acquires a captured image including ommatidium images corresponding to the respective ommatidium lenses $31_1$ to $31_4$ (ommatidium images corresponding to images formed by lights concentrated by the respective ommatidium lenses $31_1$ to $31_4$) by receiving and photoelectrically converting the lights concentrated by the respective ommatidium lenses $31_1$ to $31_4$, and supplies the captured image to the correction unit 53.

The communication unit 52 performs wired or wireless communication with the communication unit 42 and the like of the multi-eye interchangeable lens 20. Note that the communication unit 52 is also allowed to communicate with a server in the Internet, a PC in a wired or wireless LAN, or other external devices as necessary using any communication system.

For example, the communication unit 52 receives lens information associated with the multi-eye interchangeable lens 20 and transmitted from the communication unit 42 of the multi-eye interchangeable lens 20 by communicating with the communication unit 42, and supplies the received lens information to the correction unit 53 when the multi-eye interchangeable lens 20 is fitted to the camera body 10.

A captured image is supplied to the correction unit 53 from the image sensor 51. In addition, lens information received by the communication unit 52 from the multi-eye interchangeable lens 20 is supplied to the correction unit 53 from the communication unit 52. Moreover, the correction unit 53 stores sensor shading information (light reception directional characteristic for each pixel) associated with sensor shading which is shading caused by the image sensor 51 included in the camera body 10.

Light reception by each pixel of the image sensor 51 here has directivity. More specifically, in a case where lights having the same intensity are received by pixels, an output from a pixel which receives light entering in a front direction is different from an output from a pixel which receives light entering in an oblique direction. Sensor shading is such a drop of light amount (luminance) produced by the light reception directivity of the image sensor 51. Information associated with light reception directivity of the image sensor 51 corresponds to sensor shading information associated with the image sensor 51.

The correction unit 53 obtains total shading information associated with total shading which is shading caused by the multi-eye interchangeable lens 20 and the image sensor 51, i.e., total shading of a captured image acquired by the image sensor 51 as a result of reception of light concentrated by the multi-eye interchangeable lens 20, on the basis of the shading information included in the lens information received from the communication unit 52 and the sensor shading information associated with the image sensor 51, and performs shading correction for correcting shading (total shading) of the captured image received from the image sensor 51 on the basis of the obtained total shading information. Pixel values (luminance or the like) lowered by shading are corrected by the shading correction. The correction unit 53 further supplies the captured image after the shading correction to the region identification unit 54 together with the lens position information.

Information indicating luminance shading is adoptable here as the sensor shading information associated with the image sensor 51. In addition, information indicating shading of each of a plurality of colors is adoptable as the sensor shading information associated with the image sensor 51.

The sensor shading caused by the image sensor 51 may differ for each of a plurality of colors, such as R (Red), G (Green), and B (Blue). In this case, the image sensor 51 may cause color shading (color irregularity) different for each color.

Accordingly, sensor shading information which includes color shading information associated with color shading of each of R, G, and B is allowed to be stored in the correction unit 53. In this case, the correction unit 53 is allowed to correct color shading.

The region identification unit 54 identifies, on the basis of the lens position information received from the correction unit 53, regions of ommatidium images corresponding to the respective ommatidium lenses $31_1$ to $31_4$ and included in the captured image received from the correction unit 53, and outputs region identification result information indicating an identification result of the regions.

For example, the region identification unit 54 here is allowed to output a set of the captured image and region information indicating the regions of the respective ommatidium images included in the captured image as the region identification result information. Moreover, the region identification unit 54 is allowed to extract (cutting) the respective ommatidium images from the captured image, and output the respective ommatidium images as the region identification result information.

For simplifying the description, it is assumed hereinafter that the region identification unit 54 outputs the respective ommatidium images extracted from the captured image (the ommatidium images corresponding to the ommatidium lenses $31_1$ to $31_4$ here) as the region identification result information, for example.

The ommatidium images corresponding to the ommatidium lenses $31_1$ to $31_4$ and output from the region identification unit 54 are supplied to the image processing unit 55.

The image processing unit 55 performs image processing, such as refocusing for generating (reconstituting) an image focused on any object, by using ommatidium images corresponding to the respective ommatidium lenses $31_1$ to $31_4$ and received from the region identification unit 54, i.e., ommatidium images having different viewpoints located at the respective positions of the ommatidium lenses $31_1$ to $31_4$, and supplies a processing result image obtained by the image processing to the display unit 56 and the storage unit 57.

For example, the display unit 56 displays the processing result image and the like supplied from the image processing unit 55 as a through image as described with reference to FIG. 2.

The storage unit 57 includes a not-depicted memory card or the like, and stores the processing result image supplied from the image processing unit 55 according to an operation by a user or the like, for example.

<Outline of Imaging Using Multi-Eye Interchangeable Lens 20>

Figure 4:
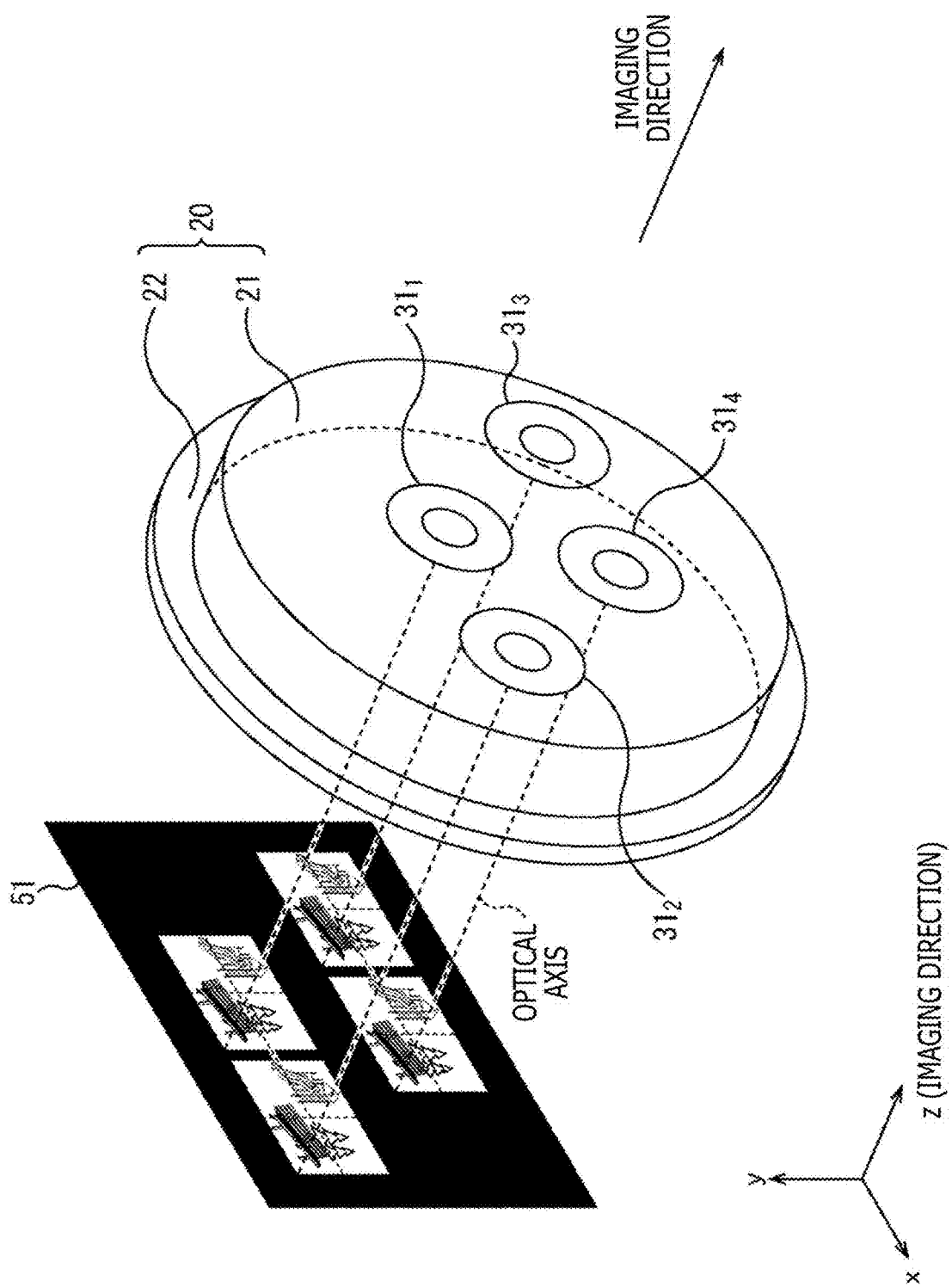
FIG. 4 is a view explaining an outline of acquisition of a captured image performed using a multi-eye interchangeable lens 20.

FIG. 4 is a view explaining an outline of acquisition of a captured image performed using the multi-eye interchangeable lens 20.

The image sensor 51 of the camera body 10 to which the multi-eye interchangeable lens 20 is fitted acquires a captured image which includes ommatidium images corresponding to images formed by lights concentrated by the respective ommatidium lenses $31_i$.

It is assumed in the present description here that a direction included in the optical axis directions of the ommatidium lenses $31_i$ and extending from the rear surface side of the camera body 10 toward the front side is a z direction (axis), and that a direction extending from the left to the right and a direction extending from the bottom to the top as viewed in the z direction are an x direction and a y direction, respectively.

In addition, for matching the left and right of an object reflected in an image with the left and right of the object in an actual space, and matching the left and right at the position of the ommatidium lens $31_i$ with the left and right of the ommatidium image corresponding to the ommatidium lens $31_i$ and included in the captured image, a position in the captured image, the position of the ommatidium lens $31_i$, and the left and right of the object, and the like will be hereinafter described as viewed in the z direction, i.e., in the imaging direction where the object to be imaged exists from the rear surface side of the camera body 10 unless otherwise noted.

Figure 5:
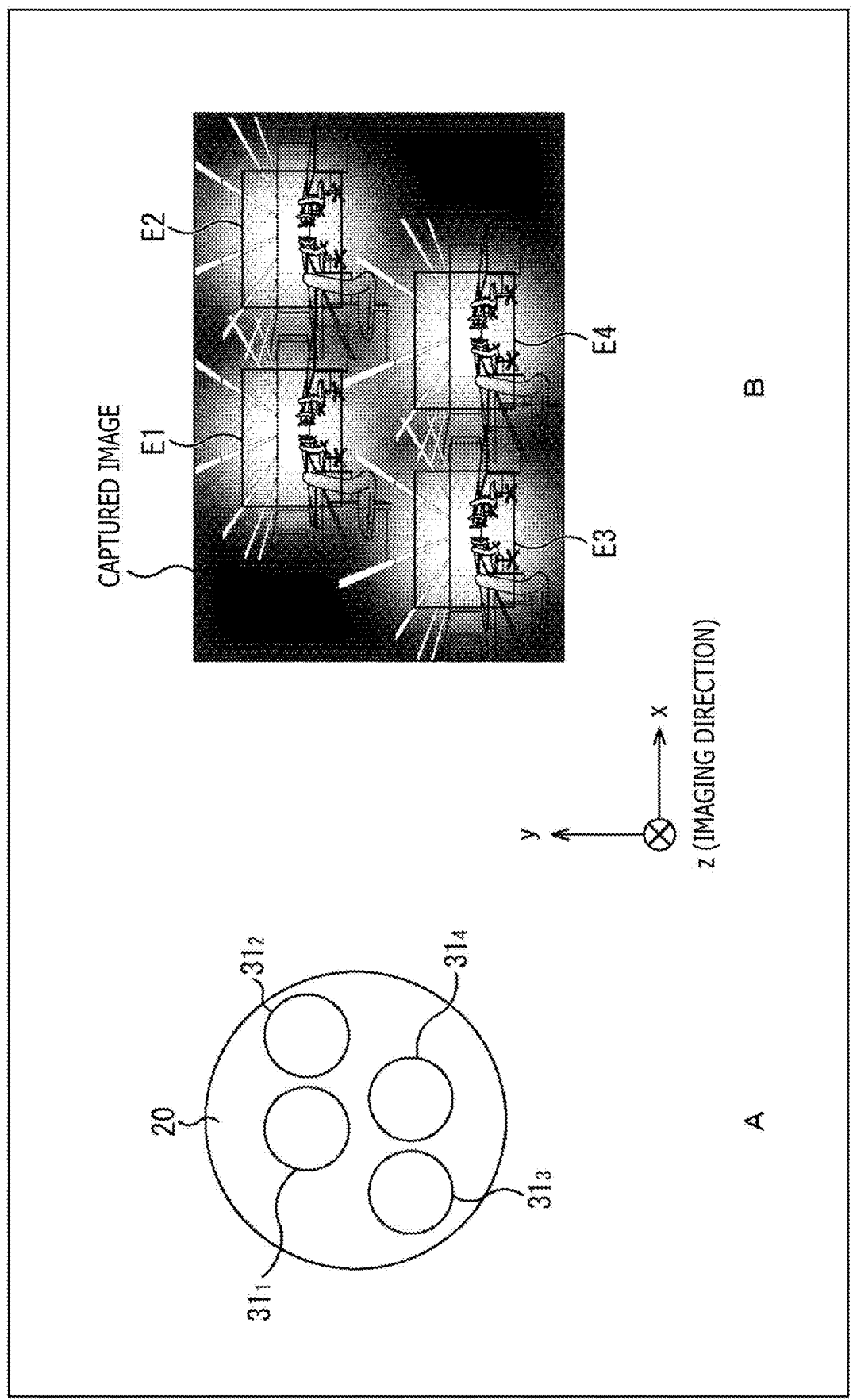
FIG. 5 is a view depicting an example of positions of ommatidium lenses $31_1$ to $31_4$ of the multi-eye interchangeable lens 20, and a captured image acquired using the multi-eye interchangeable lens 20.

FIG. 5 is a view depicting an example of the positions of the ommatidium lenses $31_1$ to $31_4$ of the multi-eye interchangeable lens 20, and a captured image acquired using the multi-eye interchangeable lens 20.

Part A of FIG. 5 is a rear view depicting an arrangement example of the ommatidium lenses $31_1$ to $31_4$ of the multi-eye interchangeable lens 20.

As depicted in FIG. 1, the ommatidium lenses $31_1$ to $31_4$ are disposed at four positions corresponding to vertexes of a rhombus in a two-dimensional plane parallel to the light receiving surface of the image sensor 51.

In FIG. 5, with respect to the ommatidium lens $31_1$, for example, included in the ommatidium lenses $31_1$ to $31_4$, the ommatidium lens $31_2$ is disposed on the right side of the ommatidium lens $31_1$. In addition, the ommatidium lens $31_3$ is disposed on the lower left side of the ommatidium lens $31_1$, while the ommatidium lens $31_4$ is disposed on the lower right side of the ommatidium lens $31_1$.

Part B of FIG. 5 is a diagram depicting an example of a captured image acquired by the image sensor 51 of the camera body 10 to which the multi-eye interchangeable lens 20 is fitted in a state where the ommatidium lenses $31_1$ to $31_4$ are disposed on the multi-eye interchangeable lens 20 in the manner depicted in part A of FIG. 5.

The captured image is an image acquired by the image sensor 51 of the camera body 10 to which the multi-eye interchangeable lens 20 including the plurality of ommatidium lenses $31_1$ to $31_4$ is fitted. The captured image includes ommatidium images E1, E2, E3, and E4 corresponding to images formed by respective lights concentrated by the plurality of ommatidium lenses $31_1$ to $31_4$.

The region identification unit 54 (FIG. 3) identifies, as a region of an ommatidium image E #i corresponding to each of the ommatidium lenses $31_1$, a rectangular region having a predetermined size and having a center located on (a position corresponding to) the optical axis of the corresponding ommatidium lens $31_i$ in a region included in the captured image as a region to which only light having passes through the corresponding ommatidium lens $31_i$ is applied on the basis of lens position information.

In this manner, the ommatidium image E #i corresponding to the ommatidium lens $31_1$ is formed as an image which is obtained by imaging from the position of the ommatidium lens $31_i$ with a viewpoint located at the position of the ommatidium lens $31_i$, and is similar to a captured image acquired by imaging using an independent camera.

<Shading Correction Process>

Figure 6:
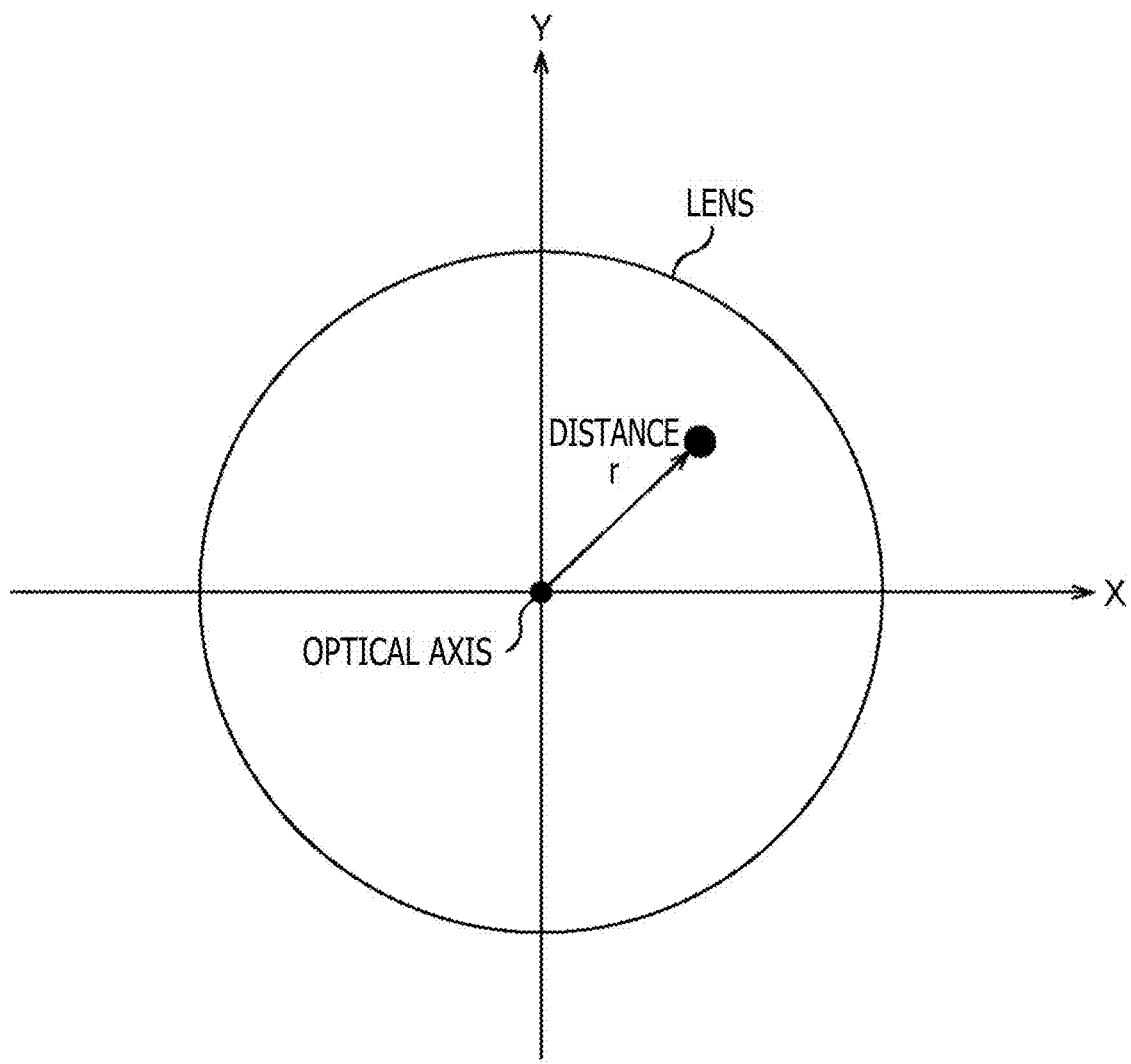
FIG. 6 is a diagram explaining lens shading.

FIG. 6 is a diagram explaining lens shading.

FIG. 6 depicts a two-dimensional coordinate system which has an X axis extending from the left toward the right, and a Y axis extending from the bottom to the top, and indicates a distance r from an optical axis of one lens.

For example, a lens produces a light amount drop called lens shading and expressed by cosine fourth law, for example, where lowering of a light amount increases as light is concentrated at a position farther from the optical axis of the lens.

The degree of the light amount drop (lowering quantity of the light amount) produced by lens shading is rotation-symmetric with respect to the optical axis of the lens, and can be expressed by a function of the distance r from the optical axis (image height).

In a case where an ordinary single interchangeable lens is fitted to the camera body 10, the center of the image sensor 51 included in the camera body 10 to which the single interchangeable lens is fitted exits on the optical axis of the single interchangeable lens. In this case, a function indicating the distance r from the optical axis of the lens and expressing a lowering quantity of a light amount produced by lens shading is allowed to be used (applied) without change as a function indicating the distance r from the center of the captured image and expressing a lowering quantity of a light amount produced by shading in the captured image. Accordingly, the camera body 10 is allowed to correct a light amount drop produced by lens shading of the captured image using the function of the distance r.

For example, correction of lens shading of the captured image (shading correction) is achieved by multiplying a pixel value of the captured image by a gain corresponding to the function expressing the lens shading for correction of the pixel value. According to the shading correction, however, pixel values are corrected not in such a manner as to equalize entire brightness of the captured image, but in such a manner as to obtain a natural captured image to a level where the light amount drop produced by shading is not noticeable. More specifically, when pixel values of the captured image are corrected in such a manner as to recover all of the light amount drop produced by shading in the shading correction, the entire brightness of the captured image becomes uniform. In this case, the captured image may become an unnatural image after the shading correction. Accordingly, in the shading correction, pixel values of the captured image are corrected not in the manner to recover all of the light amount drop produced by shading, but in the manner to recover a part of the light amount drop. Such a manner of shading correction prevents generation of an unnatural captured image after the shading correction.

When fitted to the camera body 10, an ordinary single interchangeable lens communicates with the camera body 10, and transmits, to the camera body 10, information indicating a manner of a change of the light amount according to the distance (image height) r from the center of the lens (e.g., the above function of the distance r) as lens shading information, for example. The camera body 10 performs such a shading correction which makes a light amount drop in a periphery of the single interchangeable lens less noticeable on the basis of the lens shading information transmitted from the single interchangeable lens.

For correction of total shading of a captured image, i.e., total shading caused by the single interchangeable lens and the image sensor 51, note that a gain as a correction amount for shading correction of the total shading needs to be obtained from total shading obtained from lens shading of the single interchangeable lens, a position and a diameter of an exit pupil of the single interchangeable lens, and sensor shading of the image sensor 51.

However, according to the shading correction, pixel values of the captured image are not corrected in such a manner as to recover all of a light amount drop produced by shading as described above. Therefore, a gain as a correction amount appropriate for performing shading correction of total shading may be obtained (estimated) from lens shading.

Figure 7:
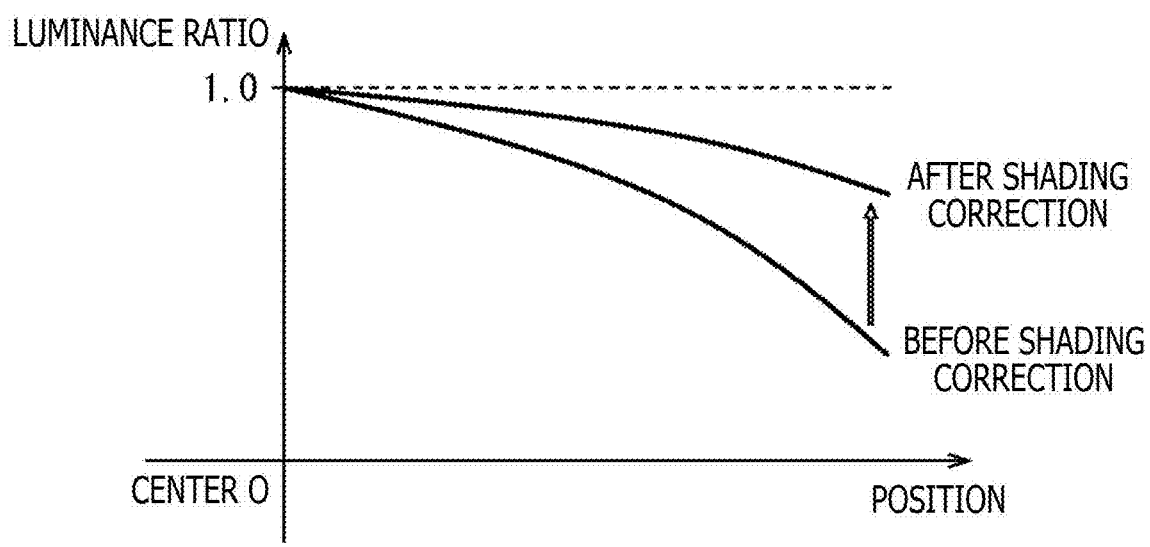
FIG. 7 is a diagram depicting an example of a shading characteristic of lens shading of a captured image in a case where an ordinary single interchangeable lens is fitted to the camera body 10.

FIG. 7 is a diagram depicting an example of a shading characteristic of lens shading of a captured image in a case where a single interchangeable lens is fitted to the camera body 10.

In FIG. 7, a horizontal axis represents a position on the image sensor 51, i.e., a position on the captured image, while a vertical axis represents luminance (luminance ratio) as a pixel value of the captured image in a case where a light amount drop is produced by lens shading with respect to luminance as a pixel value of the captured image in a case where no light amount drop is produced by lens shading. In addition, a center O represents a center of the image sensor 51, i.e., a center of the captured image. In a case where the single interchangeable lens is fitted to the camera body 10, the center O of the captured image (center O of the image sensor 51) exists on the optical axis of (the lens as the single lens included in) the single interchangeable lens.

As can be seen from the shading characteristic of the lens shading in FIG. 7, the luminance ratio decreases, i.e., the light amount drop produced by lens shading increases, as the position in the capture image is located farther from the center O of the captured image. Note that only lens shading is assumed to be taken into consideration here without considering sensor shading for simplifying the description.

According to the shading correction of the lens shading in a case where a single interchangeable lens is fitted to the camera body 10, pixel values are corrected not in such a manner as to recover all of a light amount drop produced by the lens shading, i.e., not in such a manner that the luminance ratio becomes 1.0 throughout the captured image, but in such a manner as to recover a part of the light amount drop.

The foregoing shading correction for correcting lens shading where the luminance ratio decreases with farness from the center O of the captured image is also referred to as a first shading correction.

Figure 8:
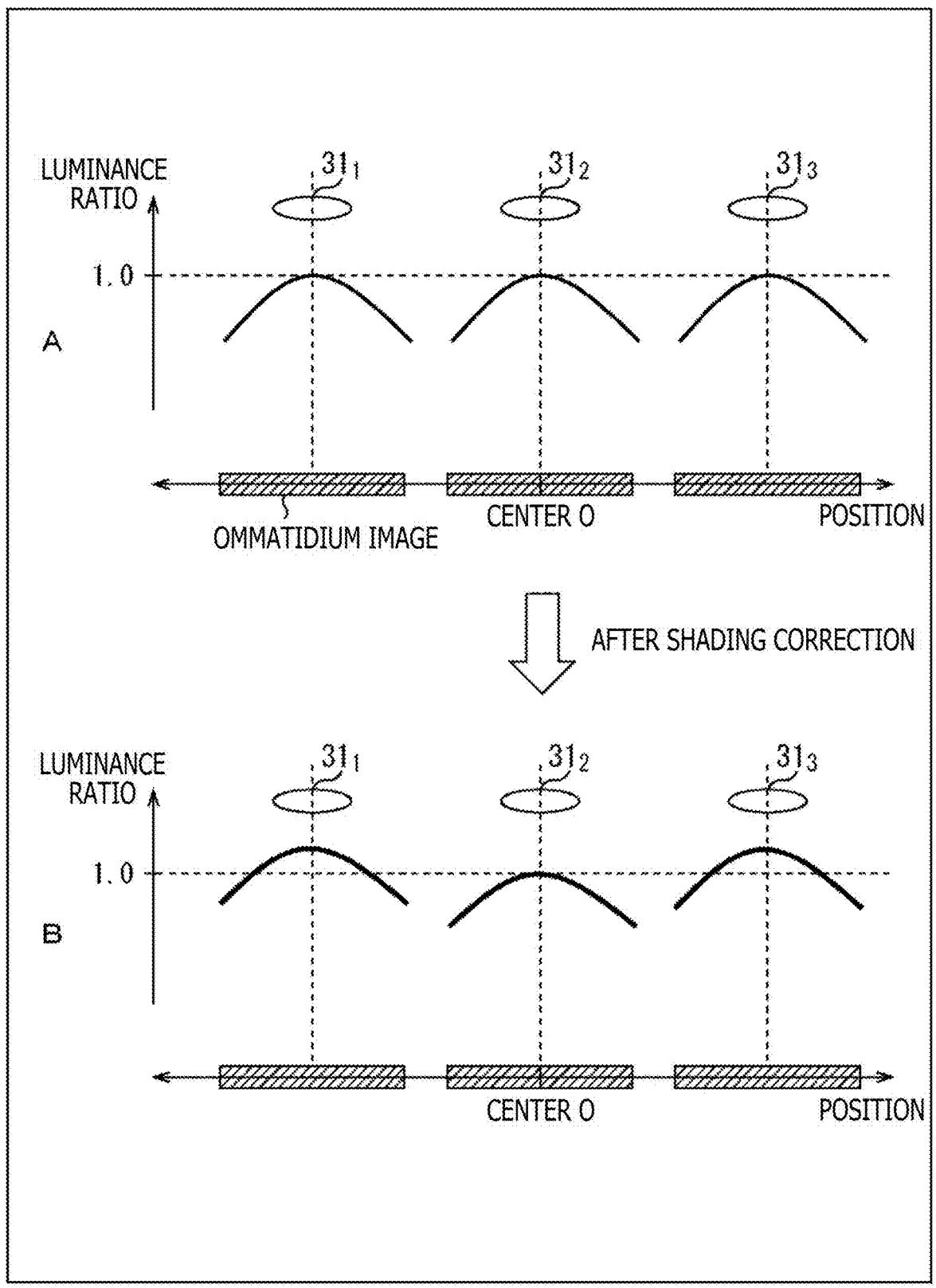
FIG. 8 is a diagram explaining a first shading correction of lens shading in a case where the multi-eye interchangeable lens 20 is fitted to the camera body 10.

FIG. 8 is a diagram explaining the first shading correction of lens shading in a case where the multi-eye interchangeable lens 20 is fitted to the camera body 10.

Note that the multi-eye interchangeable lens 20 is assumed to have the three ommatidium lenses $31_1$ to $31_3$, and that the three ommatidium lenses $31_1$ to $31_3$ are arranged in a line in the horizontal direction without overlap in the optical axis direction in FIG. 8 for simplifying the description. Moreover, similarly to FIG. 7, it is assumed that only lens shading is taken into consideration without considering sensor shading in FIG. 8.

Furthermore, in FIG. 8, a horizontal axis represents a position on the image sensor 51, i.e., a position on the captured image, while a vertical axis represents luminance (luminance ratio) as a pixel value of the captured image in a case where a light amount drop is produced by lens shading with respect to luminance as a pixel value of the captured image in a case where no light amount drop is produced by lens shading. In addition, a center O represents the center of the image sensor 51, i.e., the center of the captured image. Besides, a captured image acquired by the image sensor 51 includes ommatidium images corresponding to the ommatidium lenses $31_1$ to $31_3$.

Part A of FIG. 8 depicts an example of a shading characteristic of lens shading of the captured image in a case where the multi-eye interchangeable lens 20 is fitted to the camera body 10.

According to the ommatidium image included in the captured image and corresponding to the ommatidium lens $31_1$ in part A of FIG. 8, the luminance ratio decreases with farness from the center of the ommatidium lens $31_1$, i.e., from the center of the ommatidium image. This characteristic is also applicable to the ommatidium image corresponding to the ommatidium lens $31_2$, and the ommatidium image corresponding to the ommatidium lens $31_3$.

Part B of FIG. 8 depicts a luminance ratio of the captured image after shading correction obtained by performing the first shading correction for the captured image having the shading characteristic of lens shading depicted in part A of FIG. 8.

According to the first shading correction, pixel values of the captured image are corrected on the basis of the shading characteristic of lens shading where the luminance ratio lowers with nearness to a peripheral position not from the center of the ommatidium image but from the center O of the captured image as depicted in FIG. 7, on an assumption that the optical axis of the lens and the center O of the captured image are aligned with each other (the center O of the captured image is located on the optical axis).

However, in the case of the camera body 10 to which the multi-eye interchangeable lens 20 is fitted, the optical axis of the ommatidium lens $31_1$ included in the multi-eye interchangeable lens 20 and the center O of the image sensor 51, i.e., the center O of the captured image are not necessarily aligned with each other. Accordingly, in a case where the first shading correction assuming that the optical axis of the lens and the center O of the captured image are aligned is performed for the captured image acquired by the multi-eye interchangeable lens 20, the luminance ratio of each of the ommatidium images after the shading correction of the captured image does not become the luminance ratio for correcting the lens shading of the corresponding ommatidium lens $31_1$ as depicted in part B of FIG. 8. In this case, appropriate shading correction is difficult to achieve for the respective ommatidium images.

Accordingly, when the first shading correction is performed for the captured image acquired by the multi-eye interchangeable lens 20, luminance of a pixel included in one of two ommatidium images as targets of stereo matching and reflecting an object may be different from luminance of a pixel included in the other ommatidium image and reflecting the same object in a case where the image processing unit 55 in a following stage obtains a disparity between the ommatidium images included in the captured image after shading correction by using stereo matching or the like, for example. In this case, a correct disparity may be difficult to obtain.

In a case where a single interchangeable lens is fitted to the camera body 10, note that total shading caused by the single interchangeable lens and the image sensor 51 included in the camera body 10 is obtained from lens shading of the single interchangeable lens, a position (distance from the image sensor 51) and a diameter of an exit pupil of the single interchangeable lens, and sensor shading of the image sensor 51. In this case, total shading is obtained on an assumption that the center of the exit pupil and the center O of the captured image (the center O of the image sensor 51) are aligned with each other. Meanwhile, in a case where the multi-eye interchangeable lens 20 is fitted to the camera body 10, the center of the exit pupil of the ommatidium lens 31 and the center O of the captured image are not necessarily aligned with each other. In this case, total shading is difficult to obtain only from the lens shading, the position and the diameter of the exit pupil, and the sensor shading. Accordingly, for obtaining total shading in the case where the multi-eye interchangeable lens 20 is fitted to the camera body 10, the position of the ommatidium lens $31_i$ is needed as well as the position and the diameter of the exit pupil of the ommatidium lens $31_i$ and the sensor shading.

Figure 9:
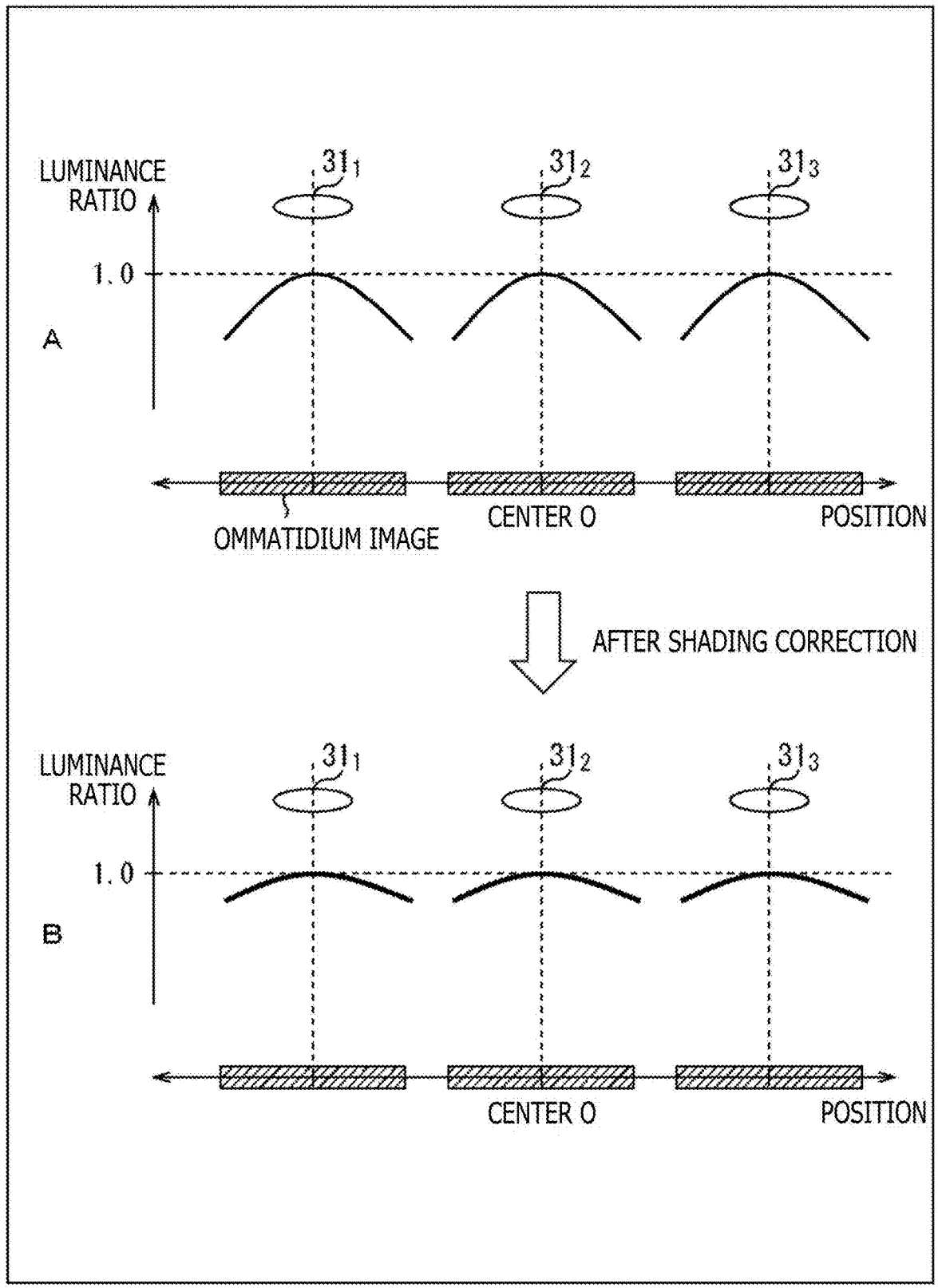
FIG. 9 is a diagram explaining a second shading correction in a case where the multi-eye interchangeable lens 20 is fitted to the camera body 10.

FIG. 9 is a diagram explaining a second shading correction which is a lens shading correction for the multi-eye interchangeable lens 20 in a case where the multi-eye interchangeable lens 20 is fitted to the camera body 10.

Note that the multi-eye interchangeable lens 20 is assumed to have the three ommatidium lenses $31_1$ to $31_3$, and that the three ommatidium lenses $31_1$ to $31_3$ are assumed to be arranged in a line in the horizontal direction without overlap in the optical axis direction in FIG. 9 for simplifying the description similarly to FIG. 8. Moreover, similarly to FIGS. 7 and 8, it is assumed that only lens shading is taken into consideration without considering sensor shading in FIG. 9.

In FIG. 9, a horizontal axis represents a position in a captured image, while a vertical axis represents a luminance ratio similarly to FIG. 8.

Part A of FIG. 9 depicts an example of a shading characteristic of lens shading of the captured image in a case where the multi-eye interchangeable lens 20 is fitted to the camera body 10.

Part A of FIG. 9 is a diagram identical to part A of FIG. 8, wherefore description of this figure is omitted.

Part B of FIG. 9 depicts the luminance ratio of the captured image after shading correction obtained by performing the second shading correction for the captured image having the shading characteristic of lens shading depicted in part A of FIG. 9.

According to the second shading correction, (the center of) the position of the ommatidium image included in the captured image acquired by the image sensor 51 and corresponding to the ommatidium lens $31_i$ is recognized from lens position information included in shading information supplied from the communication unit 52, and pixel values of the captured image are corrected on the basis of the shading characteristic of lens shading where the luminance ratio lowers toward a peripheral position from the center of each of the ommatidium images of the captured image. Accordingly, in the second shading correction, the position of the center of the ommatidium image captured by the ommatidium lens $31_i$ is recognized from lens position information included in shading information and associated with the ommatidium lens $31_i$, and an appropriate shading correction of lens shading is performed for the respective ommatidium images.

By performing the appropriate shading correction in such a manner, luminance of a pixel included in one of two ommatidium images as targets of stereo matching and reflecting an object becomes (substantially) equivalent to luminance of a pixel included in the other ommatidium image and reflecting the same object in a case where the image processing unit 55 in a following stage obtains a disparity between ommatidium images included in a captured image after shading correction by using stereo matching or the like, for example. Accordingly, a correct disparity is obtained.

Figure 10:
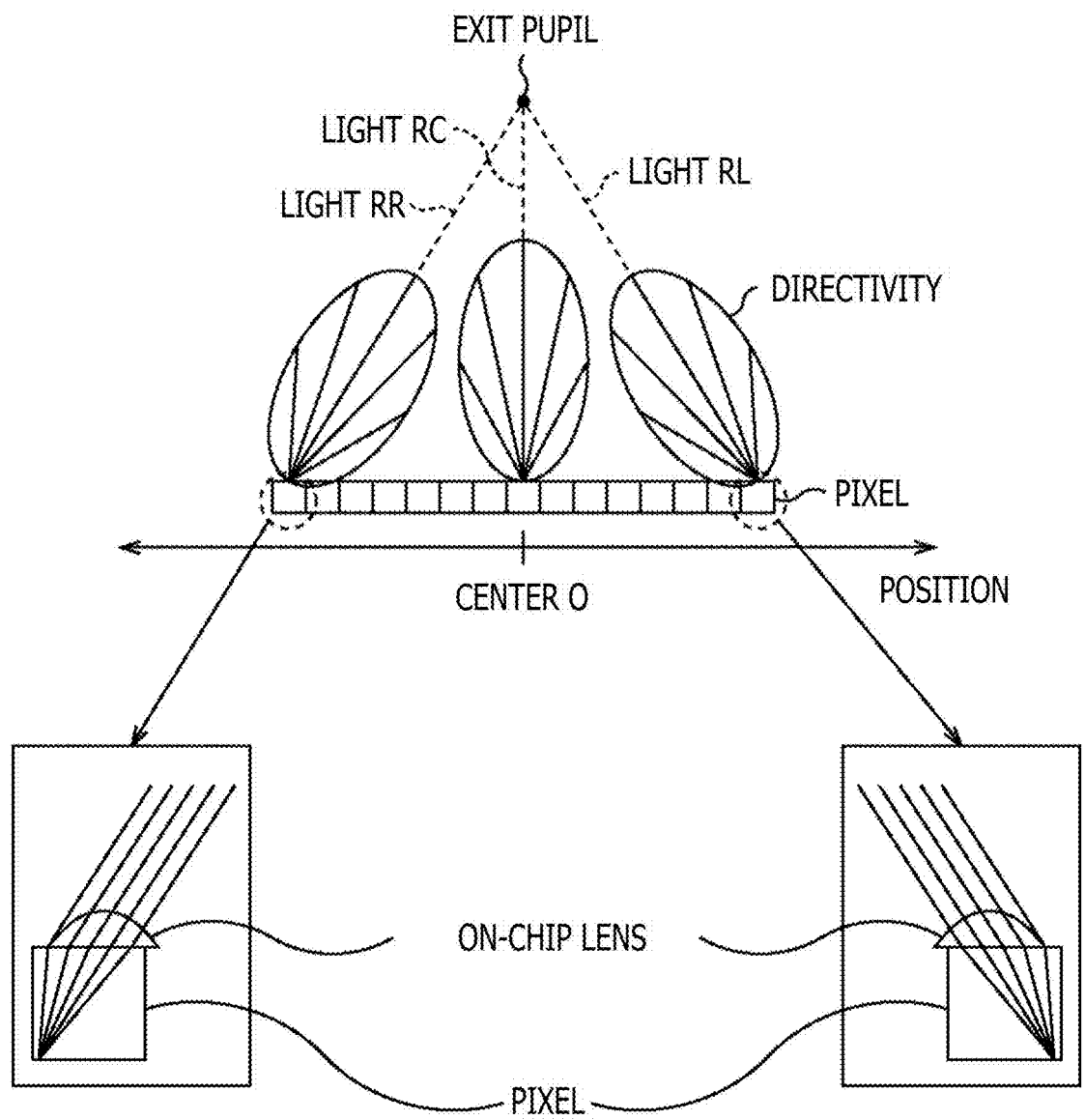
FIG. 10 is a diagram explaining light reception directivity of an image sensor 51 of the camera body 10.

FIG. 10 is a diagram explaining light reception directivity of the image sensor 51 of the camera body 10.

The image sensor 51 is configured to have predetermined directivity for light reception on an assumption that imaging is performed by receiving light entering via a single (interchangeable) lens. In this case, a light amount drop called sensor shading is produced as a result of this directivity of the image sensor 51.

More specifically, the image sensor 51 is configured to have such directivity that a pixel in the vicinity of the center O of the image sensor 51 has maximum light reception sensitivity to light RC coming in the front direction, that a pixel in the vicinity of the right end has maximum light reception sensitivity to light RL coming in a diagonally left direction, and that a pixel in the vicinity of the left end has maximum light reception sensitivity to light coming in a diagonally right direction, on an assumption that the optical axis of the lens, i.e., the center of the exit pupil exists at the center O of the image sensor 51.

This directivity is achievable by controlling arrangement positions of on-chip lenses disposed on the respective pixels of the image sensor 51.

The pixel at the center O of the image sensor 51 is given directivity which maximizes light reception sensitivity to the light RC coming in the front direction by positioning the on-chip lens such that the optical axis of the on-chip lens passes through the center of the pixel. The pixel at the left end of the image sensor 51 is given directivity which maximizes light reception sensitivity to light RR coming in the diagonally right direction by positioning the on-chip lens such that the optical axis of the on-chip lens passes through the right side of the center of the pixel. Similarly, the pixel at the right end of the image sensor 51 is given directivity which maximizes light reception sensitivity to the light RL coming in the diagonally left direction by positioning the on-chip lens such that the optical axis of the on-chip lens passes through the left side of the center of the pixel.

Figure 11:
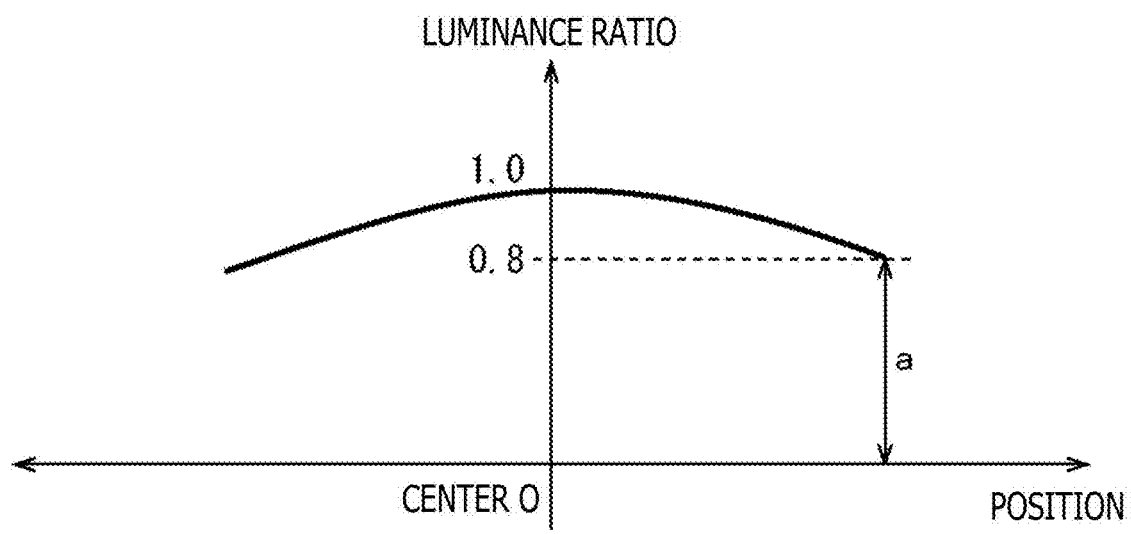
FIG. 11 is a diagram depicting an example of a shading characteristic of sensor shading of a captured image in a case where a single interchangeable lens is fitted to the camera body 10.

FIG. 11 is a diagram depicting an example of a shading characteristic of sensor shading of a captured image in a case where a single interchangeable lens is fitted to the camera body 10.

In FIG. 11, a horizontal axis represents a position of a pixel on the image sensor 51, i.e., a position on the captured image, while a vertical axis represents luminance (luminance ratio) as a pixel value of the captured image in a case where a light amount drop is produced by sensor shading with respect to luminance as a pixel value of the captured image in a case where no light amount drop is produced by sensor shading. In addition, a center O represents the center of the image sensor 51, i.e., the center of the captured image.

As can be seen from the shading characteristic of the sensor shading in FIG. 11, the luminance ratio decreases, i.e., the light amount drop produced by sensor shading increases, as the position in the capture image is located at a longer distance from the center O of the captured image.

It is assumed here that an output (luminance ratio) of a pixel at a predetermined position not the center O of the image sensor 51 is a.

Sensor shading caused by the image sensor 51 is dependent on a distance from the center O of the image sensor 51 and a position of an exit pupil of an interchangeable lens.

(Light reception) directivity of the image sensor 51 is given such that the output a of the pixel becomes the maximum value when the exit pupil is located at a position (hereinafter also referred to as an assumption position) assumed to be located on a straight line passing through the center O of the image sensor 51 and perpendicular to the light receiving surface of the image sensor, and at a predetermined distance from the image sensor 51. Accordingly, the output a of the pixel becomes smaller than the maximum value when the position of the exit pupil of the interchangeable lens attached to the camera body 10 deviates either toward the image sensor 51 or toward the side opposite to the image sensor 51 from the assumption position.

Figure 12:
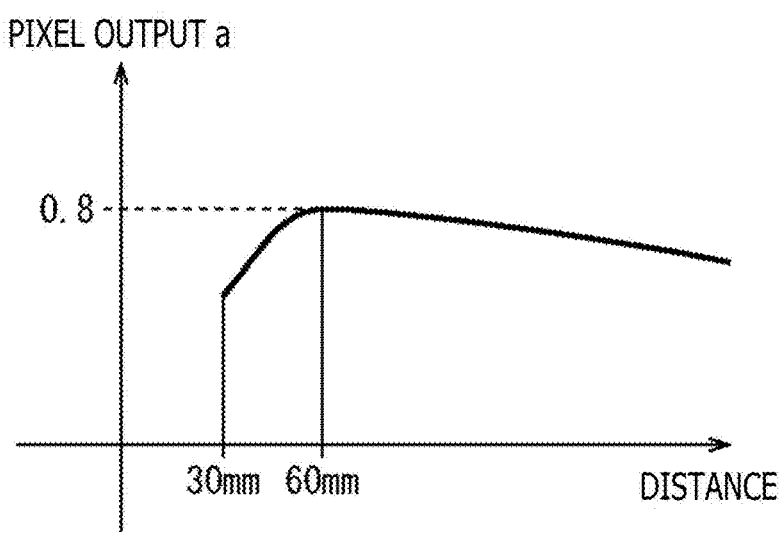
FIG. 12 is a diagram depicting an example of a relationship between a position of an exit pupil and an output a of a pixel.

FIG. 12 is a diagram depicting an example of a relationship between a position of an exit pupil and the output a of a pixel.

In FIG. 12, a horizontal axis represents a distance of a position of an exit pupil from the image sensor 51, while a vertical axis represents the output a of a pixel of the image sensor 51, i.e., luminance (luminance ratio) as a pixel value of the captured image in a case where a light amount drop is produced by sensor shading with respect to luminance as a pixel value of the captured image in a case where no light amount drop is produced by sensor shading.

In FIG. 12, the assumption position here is a position at a distance of 60 mm from the image sensor 51. The output a of a pixel has a maximum value of 0.8 when the exit pupil is located at a distance of 60 mm which is an assumption distance from the image sensor 51.

Accordingly, the output a of the pixel decreases in a case where an interchangeable lens having an exit pupil located at a distance longer than 60 mm from the image sensor 51 is fitted to the camera body 10.

Note that an assumption position of an exit pupil of a mirrorless camera is located at a position of approximately 50 mm from an image sensor, for example. A position of an exit pupil of a single-lens reflex camera which is not mirrorless is often located at a position of approximately 100 mm from an image sensor, for example.

Figure 13:
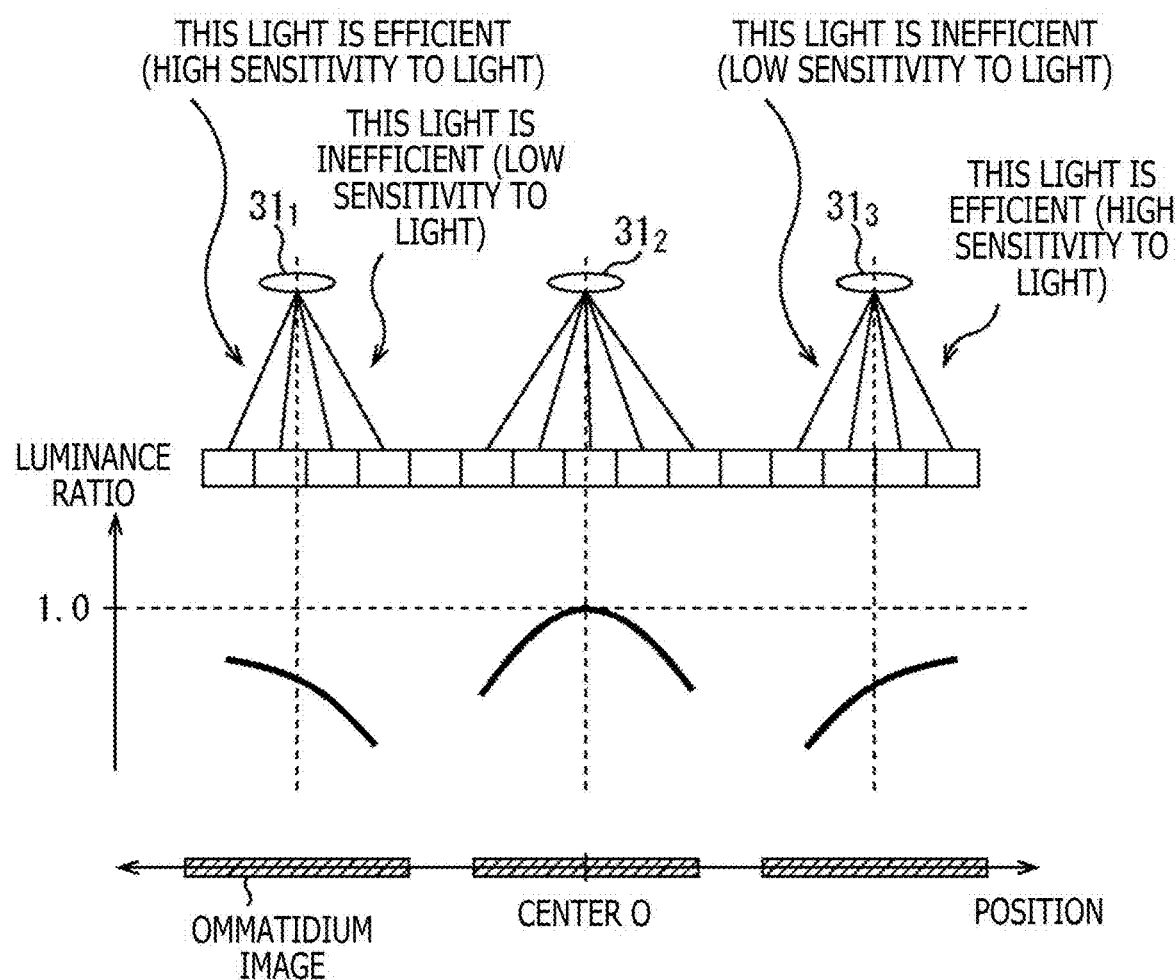
FIG. 13 is a diagram explaining a shading characteristic of sensor shading in a case where the multi-eye interchangeable lens 20 is fitted to the camera body 10.

FIG. 13 is a diagram explaining a shading characteristic of sensor shading in a case where the multi-eye interchangeable lens 20 is fitted to the camera body 10.

Note that the multi-eye interchangeable lens 20 is assumed to have the three ommatidium lenses $31_1$ to $31_3$, and that the three ommatidium lenses $31_1$ to $31_3$ are arranged in a line in the horizontal direction without overlap in the optical axis direction in FIG. 13 for simplifying the description similarly to FIG. 8 (and FIG. 9).

In addition, in FIG. 13, a horizontal axis represents a position on a captured image, while a vertical axis represents a luminance ratio similarly to FIG. 8 (and FIG. 9).

FIG. 13 depicts a shading characteristic of sensor shading of a captured image in a case where the multi-eye interchangeable lens 20 is fitted to the camera body 10.

According to an ommatidium image included in the captured image and corresponding to the ommatidium lens $31_1$ in FIG. 13, the luminance ratio decreases with nearness to the right side of the ommatidium lens $31_1$ from the left side of the ommatidium lens $31_1$, i.e., with nearness to the right side of the ommatidium image (the center O of the captured image) from the left side. This characteristic is produced because directivity is given to a pixel in the vicinity of the left end of the image sensor 51 as a pixel to which light enters from the ommatidium lens $31_1$ such that light reception sensitivity to the light coming in the diagonally right direction becomes the maximum, and because particularly sensitivity to light coming in the front direction and the diagonally left direction is low.

Moreover, according to an ommatidium image included in the captured image and corresponding to the ommatidium lens $31_2$ in FIG. 13, the luminance ratio decreases with farness from the center of the ommatidium lens $31_2$, i.e., from the center of the ommatidium image. This characteristic is produced because directivity is given to a pixel in the vicinity of the center O of the image sensor 51 as a pixel to which light enters from the ommatidium lens $31_2$ such that light reception sensitivity to the light coming in the front direction becomes the maximum, and because sensitivity to light coming in the diagonally left direction and the diagonally right direction is low.

Furthermore, according to an ommatidium image included in the captured image and corresponding to the ommatidium lens $31_3$ in FIG. 13, the luminance ratio decreases with nearness to the left side of the ommatidium lens $31_3$ from the right side of the ommatidium lens $31_3$, i.e., with nearness to the left side of the ommatidium image (the center O of the captured image) from the right side of the ommatidium image. This characteristic is produced because directivity is given to a pixel in the vicinity of the right end of the image sensor 51 as a pixel to which light enters from the ommatidium lens $31_3$ such that light reception sensitivity to the light coming in the diagonally left direction becomes maximum, and because particularly sensitivity to light coming in the front direction and the diagonally right direction is low.

According to the second shading correction for the multi-eye interchangeable lens 20, a position and the like of an exit pupil corresponding to the ommatidium lens 31; and included in a captured image acquired by the image sensor 51 are recognized from exit pupil position information or the like included in shading information supplied from the communication unit 52, and pixel values of the captured image are corrected on the basis of a shading characteristic of sensor shading as depicted in FIG. 13 and obtained from a direction of light entering the image sensor 51 from the exit pupil at that position, and information associated with directivity of the image sensor 51 as sensor shading information stored in the correction unit 53.

Figure 14:
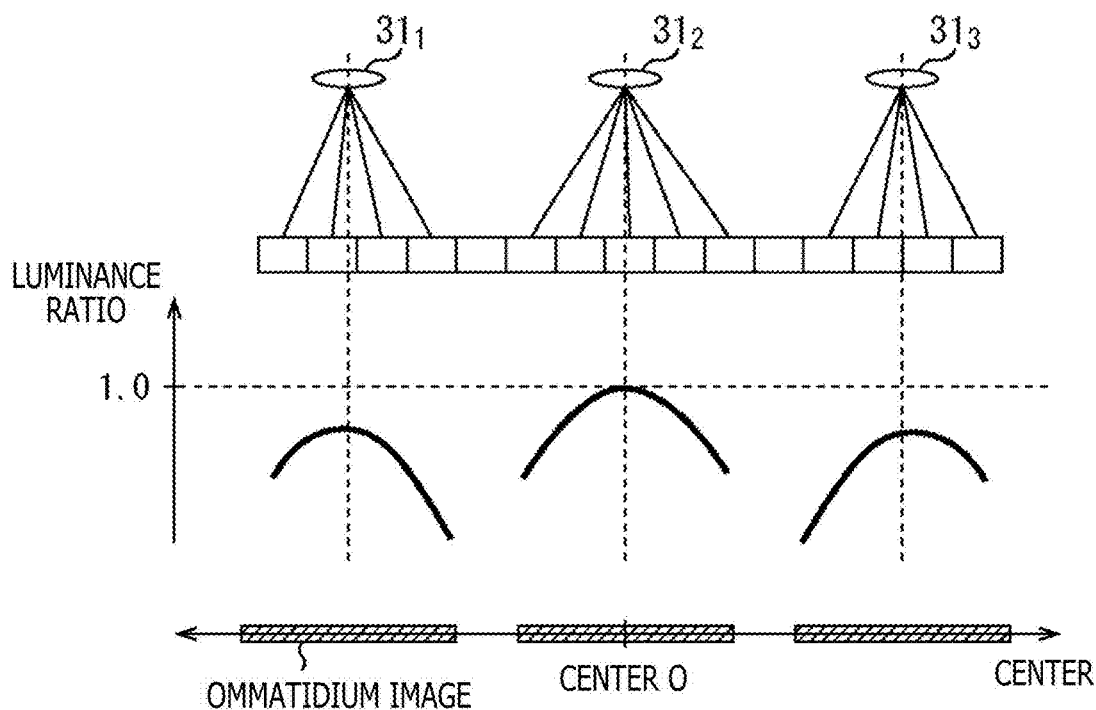
FIG. 14 is a diagram depicting an example of a shading characteristic of total shading of a captured image in a case where the multi-eye interchangeable lens 20 is fitted to the camera body 10.

FIG. 14 is a diagram depicting an example of a shading characteristic of total shading of a captured image in a case where the multi-eye interchangeable lens 20 is fitted to the camera body 10.

Note that the multi-eye interchangeable lens 20 is assumed to have the three ommatidium lenses $31_1$ to $31_3$, and that the three ommatidium lenses $31_1$ to $31_3$ are arranged in a line in the horizontal direction without overlap in the optical axis direction in FIG. 14 for simplifying the description similarly to FIG. 8 (and FIGS. 9 and 13).

In addition, in FIG. 14, a horizontal axis represents a position on a captured image, while a vertical axis represents a luminance ratio similarly to FIG. 8 (and FIGS. 9 and 13).

FIG. 14 depicts an example of a shading characteristic of total shading of a captured image in a case where the multi-eye interchangeable lens 20 is fitted to the camera body 10. The shading characteristic of the total shading depicted in FIG. 14 here is a shading characteristic obtained by synthesizing (multiplying) the shading characteristic of the lens shading depicted in FIGS. 8 and 9 and (by) the shading characteristic of the sensor shading depicted in FIG. 13.

According to the ommatidium image included in the captured image and corresponding to each of the ommatidium lenses $31_i$ in FIG. 14, the luminance ratio decreases with farness from the center of each of the ommatidium lens $31_i$, i.e., from the center of the ommatidium image.

Note that sensor shading of a pixel on the right side in pixels of the image sensor 51 which receives light from the ommatidium lens $31_1$ is larger than sensor shading of a pixel on the left side according to the shading characteristic of the sensor shading in the ommatidium image included in the captured image and corresponding to the ommatidium lens $31_1$. Accordingly, total shading in a right part of the ommatidium image corresponding to the ommatidium lens $31_1$ is larger than total shading in a left part (the luminance ratio is smaller).

Similarly, sensor shading of a pixel on the left side in pixels of the image sensor 51 which receives light from the ommatidium lens $31_3$ is larger than sensor shading of a pixel on the right side according to the shading characteristic of the sensor shading in the ommatidium image included in the captured image and corresponding to the ommatidium lens $31_3$. Accordingly, total shading in a left part of the ommatidium image corresponding to the ommatidium lens $31_3$ is larger than total shading in a right part (the luminance ratio is smaller).

In a case where the multi-eye interchangeable lens 20 is fitted to the camera body 10, the correction unit 53 performs the second shading correction for the multi-eye interchangeable lens 20 to correct a light amount drop produced by total shading obtained from lens shading depicted in part A of FIG. 8 and sensor shading depicted in FIG. 13.

More specifically, in the second shading correction performed by the correction unit 53, pixel values of the captured image are corrected in such a manner as to correct total shading identified from shading information supplied from the communication unit 52 and sensor shading information stored in the correction unit 53.

Figure 15:
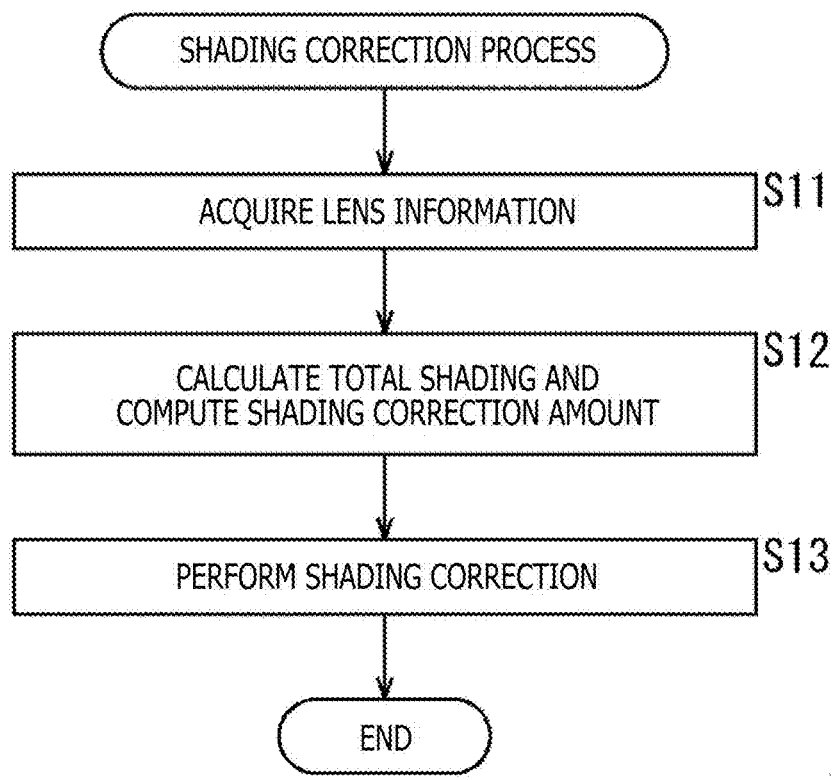
FIG. 15 is a flowchart explaining shading correction performed by a correction unit 53 in FIG. 3.

FIG. 15 is a flowchart explaining shading correction performed by the correction unit 53 in FIG. 3.

In step S11, the correction unit 53 acquires lens information supplied from the communication unit 52, and the process proceeds from step S11 to step S12.

More specifically, when the multi-eye interchangeable lens 20 is fitted to the camera body 10, the communication unit 52 receives lens information associated with the multi-eye interchangeable lens 20 and transmitted from the communication unit 42 of the multi-eye interchangeable lens 20 by communicating with the communication unit 42, and supplies the received lens information to the correction unit 53. The correction unit 53 acquires the lens information supplied from the communication unit 52 in the above manner.

In step S12, the correction unit 53 calculates total shading (shading caused by the multi-eye interchangeable lens 20 and the image sensor 51) of ommatidium images E1, E2, E3, and E4 corresponding to the ommatidium lenses $31_1$ to $31_4$ and included in the captured image supplied from the image sensor 51 on the basis of stored sensor shading information associated with the image sensor 51 and shading information included in the lens information acquired from the communication unit 52. The correction unit 53 also calculates a shading correction amount for correcting total shading, and the process proceeds from step S12 to step S13.

In step S13, the correction unit 53 performs shading correction for correcting pixel values of the captured image in accordance with the shading correction amount obtained in step S12, and outputs the captured image after the shading correction. Thereafter, the process ends.

As described above, the multi-eye interchangeable lens 20 includes the ommatidium lenses $31_1$ to $31_4$ disposed in such a manner as not to overlap with each other (as viewed) in the optical axis direction, and transmits lens information which includes shading information associated with shading of each of the ommatidium images corresponding to the ommatidium lenses $31_1$ to $31_4$ to the camera body 10 as an external component, for example. In addition, the camera body 10 receives the lens information, and corrects total shading of the ommatidium images E1 to E4 included in the captured image and corresponding to the ommatidium lenses $31_1$ to $31_4$ on the basis of shading information included in the lens information. Accordingly, shading of the ommatidium images E1 to E4 can appropriately be corrected.

Note that information including total shading information associated with total shading and considering lens position information indicating the ommatidium lens $31_i$ is adoptable as the shading information.

In this case, information associated with total shading which is shading including lens shading caused by each of the ommatidium lenses $31_1$ to $31_4$ included in the multi-eye interchangeable lens 20 and sensor shading caused by an ordinary image sensor is adoptable as the total shading information.

The sensor shading here differs individually, and the total shading is variable according to a change of the sensor shading. Accordingly, for obtaining accurate total shading in the case of the camera body 10, for example, sensor shading information associated with the image sensor 51 included in the camera body 10 needs to be stored in the (correction unit 53 of) the camera body 10, and obtain total shading using the stored sensor shading information as described above.

Therefore, in a case where information associated with total shading which includes lens shading caused by the respective ommatidium lenses $31_1$ to $31_4$ included in the multi-eye interchangeable lens 20 and sensor shading caused by an ordinary (typical) image sensor is adopted as the total shading information, a difference in total shading produced by an individual difference of the sensor shading is ignored. However, the difference in total shading produced by the individual difference of the sensor shading is not a considerable difference. Accordingly, adoption of information associated with total shading which includes lens shading caused by the respective ommatidium lenses $31_1$ to $31_4$ included in the multi-eye interchangeable lens 20 and sensor shading caused by the ordinary image sensor as the total shading information is practically effective. The ordinary image sensor here may be a certain existing image sensor or a virtual image sensor representing a large number of existing image sensors.

In a case where shading information includes total shading information, this total shading information is allowed to be obtained beforehand from lens position information, lens shading information, exit pupil position information, and exit pupil diameter information associated with the multi-eye interchangeable lens 20, and sensor shading information associated with an ordinary image sensor, for example.

Moreover, an image capturing a predetermined object and acquired by the multi-eye interchangeable lens 20 fitted to the camera body 10 or other camera bodies is adoptable as the total shading information. For example, an object having one color and no pattern, such as uniform white paper is adoptable as the predetermined object. Furthermore, a shading characteristic obtained from an image capturing the predetermined object and acquired by the multi-eye interchangeable lens 20 is adoptable as the total shading information.

Besides, in a case where a unique lens ID (IDentification) is allocated to the multi-eye interchangeable lens 20, and in a case where a database is prepared in which the lens ID is associated with total shading information associated with the multi-eye interchangeable lens 20 identified by the lens ID, the lens ID of the multi-eye interchangeable lens 20 is adoptable as the shading information. In this case, the total shading information which indicates the multi-eye interchangeable lens 20 associated with the lens ID can be acquired by searching the corresponding lens ID as a keyword in the database.

<Ommatidium Image Region Identification Process>

Figure 16:
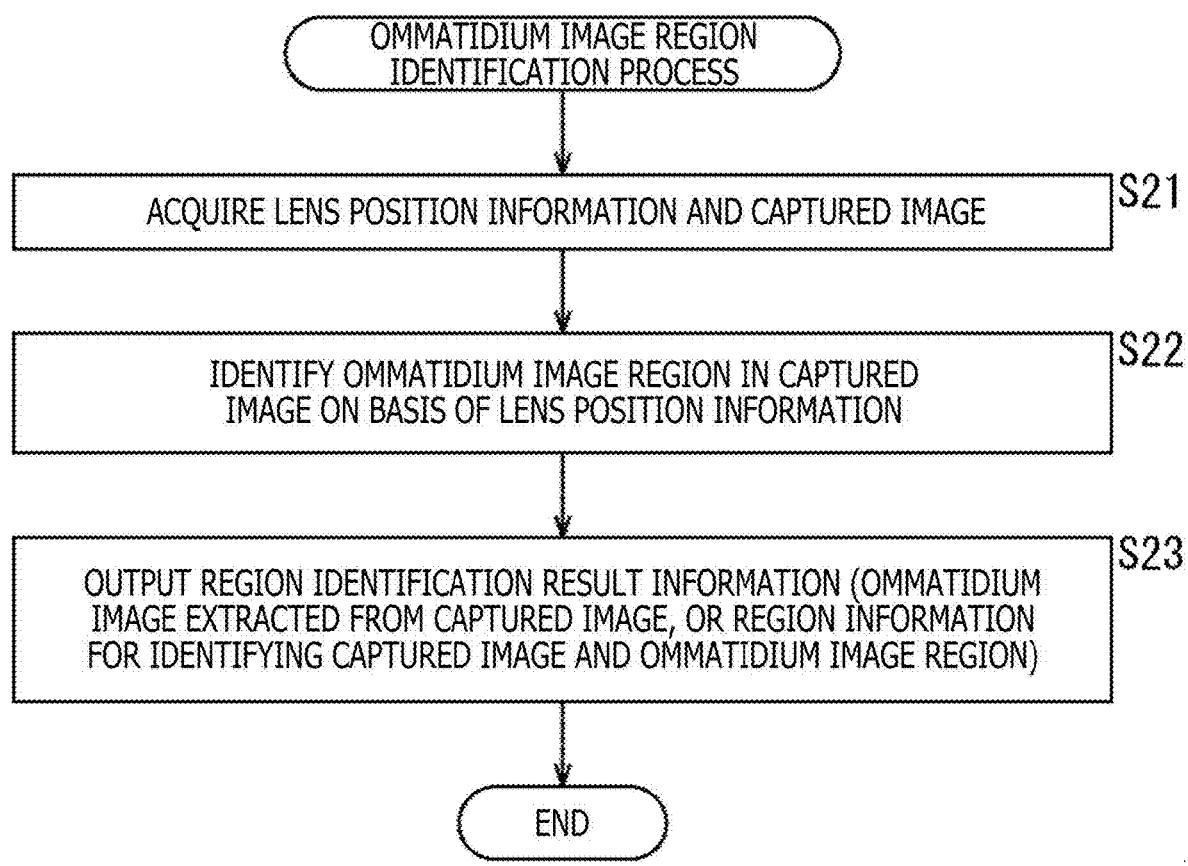
FIG. 16 is a flowchart explaining an example of a region identification process performed by a region identification unit 54 to identify regions of respective ommatidium images E #i in a captured image.

FIG. 16 is a flowchart explaining an example of a region identification process performed by the region identification unit 54 in FIG. 3 to identify regions of respective ommatidium images E #i in a captured image.

In step S21, the region identification unit 54 acquires lens position information and a captured image (after shading correction) supplied from the correction unit 53, and the process proceeds to step S22.

In step S22, the region identification unit 54 identifies, on the basis of the lens position information acquired from the correction unit 53, the regions of ommatidium images E1, E2, E3, and E4 corresponding to the respective ommatidium lenses $31_1$ to $31_4$ and included in the captured image acquired from the correction unit 53. Thereafter, the process proceeds to step S23.

In step S23, the region identification unit 54 extracts the ommatidium images E1 to E4 from the captured image, and outputs the ommatidium image E1 to E4 as region identification result information. Thereafter, the process ends.

Note that the region identification unit 54 is allowed to output, instead of the ommatidium image E1 to E4, a set of the captured image and region information indicating the regions of the respective ommatidium images E #i included in the captured image as the region identification result information as described with reference to FIG. 3.

Note that the camera body 10 in FIG. 3 performs shading correction of the captured image at the correction unit 53, and then performs the region identification process targeting the captured image after the shading correction at the region identification unit 54 as described above. Alternatively, for example, the region identification process targeting the captured image acquired by the image sensor 51 is allowed to be initially performed at the region identification unit 54, and then the shading correction of the captured image after the region identification process is allowed to be performed at the correction unit 53.

<Configuration Example of Image Processing Unit 55>

Figure 17:
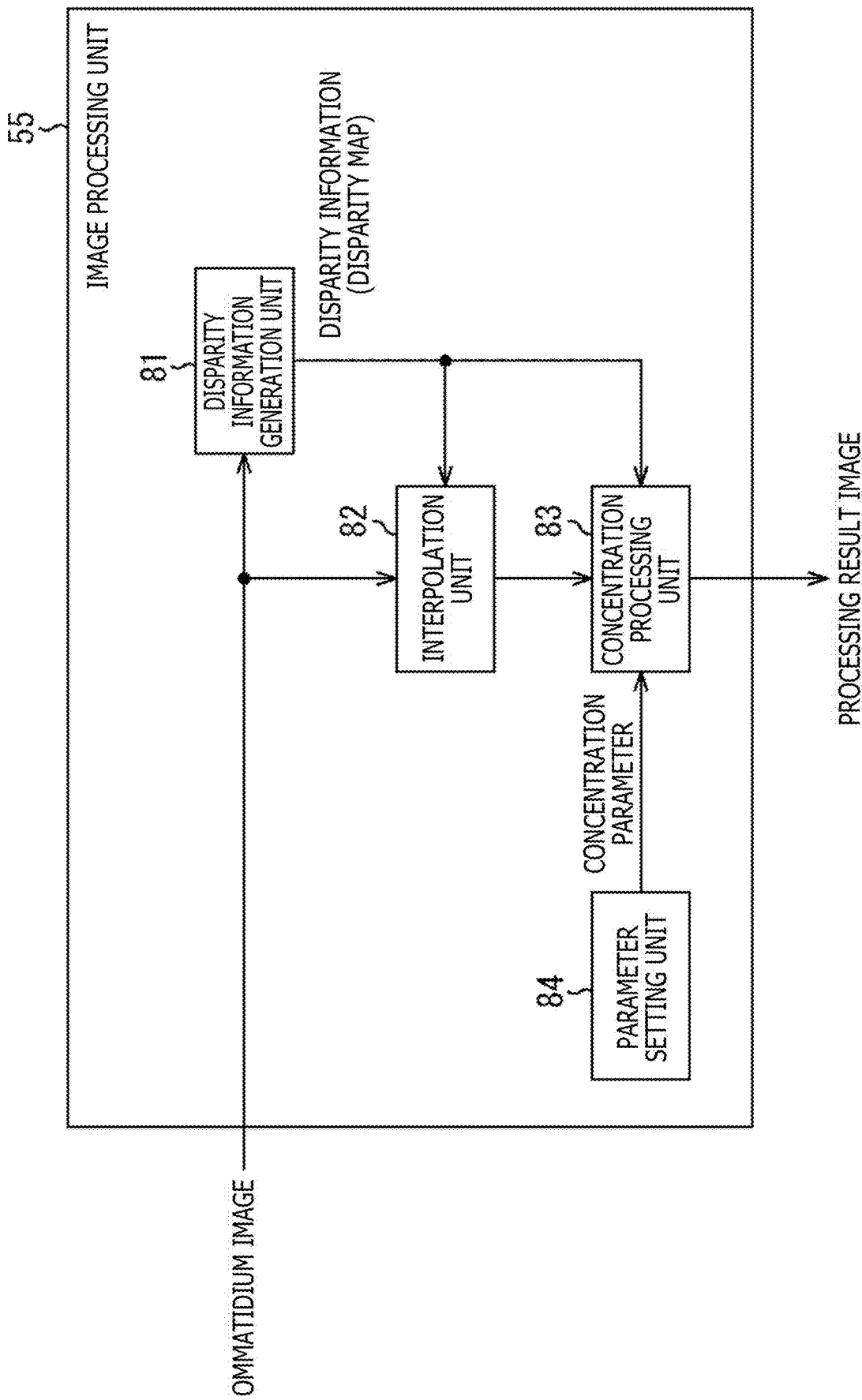
FIG. 17 is a block diagram depicting a functional configuration example of a section included in an image processing unit 55 and performing refocusing.

FIG. 17 is a block diagram depicting a functional configuration example of a section included in the image processing unit 55 in FIG. 3 and performing refocusing.

In a case where the multi-eye interchangeable lens 20 includes the ommatidium lenses $31_1$ to $31_4$ here as described in FIG. 5, for example, the ommatidium images E1 to E4 corresponding to the ommatidium lenses $31_1$ to $31_4$ are supplied from the region identification unit 54 to the image processing unit 55. The ommatidium images E1 to E4 corresponding to the ommatidium lenses $31_1$ to $31_4$ and supplied from the region identification unit 54 to the image processing unit 55 are images obtained by imaging at viewpoints of the ommatidium lenses $31_1$ to $31_4$ and similar to captured images acquired by imaging using independent cameras from the respective positions of the ommatidium lenses $31_1$ to $31_4$, and are therefore images having different viewpoints.

The image processing unit 55 in FIG. 17 includes a disparity information generation unit 81, an interpolation unit 82, a concentration processing unit 83, and a parameter setting unit 84.

Ommatidium images E #i having a plurality of viewpoints as image of a plurality of viewpoints are supplied from the region identification unit 54 to the image processing unit 55.

Note that the viewpoints of the ommatidium images E #i here correspond to positions of the ommatidium lenses $31_i$.

The ommatidium images E #i are supplied to the disparity information generation unit 81 and the interpolation unit 82 in the image processing unit 55.

The disparity information generation unit 81 obtains disparity information using the ommatidium images E #i having a plurality of viewpoints and supplied from the region identification unit 54, and supplies the disparity information to the interpolation unit 82 and the concentration processing unit 83.

More specifically, for example, the disparity information generation unit 81 performs a process for obtaining disparity information indicating a disparity from a different ommatidium image E #j for each of the ommatidium images E #i supplied from the region identification unit 54 as image processing for the ommatidium images E #i having a plurality of viewpoints. Subsequently, for example, the disparity information generation unit 81 generates a map where the disparity information is registered for each of (positions) of pixels of the ommatidium images, and supplies the map to the interpolation unit 82 and the concentration processing unit 83.

Any information allowed to be converted into a disparity, such as a disparity (disparity) expressed by the number of pixels, and a distance corresponding to a disparity and extending in a depth direction is adoptable here as the disparity information. According to the present embodiment, the disparity expressed by the number of pixels is adopted as the disparity information, for example. It is assumed that the disparity information generation unit 81 generates a disparity map where this disparity is registered as a map where the disparity information is registered.

The interpolation unit 82 generates, by interpolation, an image which may be obtained if imaging is performed from a viewpoint other than the viewpoints of the ommatidium images E #i, i.e., a viewpoint other than the positions of the ommatidium lenses $31_i$, by interpolation using the plurality of ommatidium images E #i received from the region identification unit 54 and the disparity map received from the disparity information generation unit 81.

For example, the interpolation unit 82 generates, by interpolation, images having viewpoints for interpolation (images which may be obtained in a case where imaging is performed from the viewpoints for interpolation) by interpolation using, as the viewpoints for interpolation, a plurality of points disposed at substantially equal intervals within a region surrounded by straight lines connecting the positions of the viewpoints of the ommatidium images E #i, i.e., the positions of the ommatidium lenses $31_i$.

Note that the interpolation unit 82 is also allowed to generate the images having the viewpoints for interpolation by using points outside the region surrounded by the straight lines connecting the positions of the ommatidium lenses 31i.

After generating the images having the viewpoints for interpolation, the interpolation unit 82 supplies the ommatidium images E #i and the images having the viewpoints for interpolation to the concentration processing unit 83.

The images generated by interpolation performed by the interpolation unit 82 using the ommatidium images are here also referred to as interpolation images.

In addition, the ommatidium images E #i and the interpolation images having the viewpoints for interpolation and supplied from the interpolation unit 82 to the concentration processing unit 83 are also collectively referred to as viewpoint images.

Interpolation performed by the interpolation unit 82 can be considered as a process for generating viewpoint images having a larger number of viewpoints from the ommatidium images E #i having a plurality of viewpoints. This process for generating the viewpoint images having a large number of viewpoints can be regarded as a process for reproducing lights entering from actual space points within an actual space.

The concentration processing unit 83 performs a concentration process which is image processing carried out by an actual camera to form an image of an object by concentrating light, which has passed through an optical system such as a lens from the object, on an image sensor or a film using the viewpoint images having the plurality of viewpoints and received from the interpolation unit 82.

In the concentration process performed by the concentration processing unit 83, refocusing for generating (reconstituting) an image focused on any object is carried out. Refocusing is performed using the disparity map received from the disparity information generation unit 81, or a concentration parameter received from the parameter setting unit 84.

An image obtained as a result of the concentration process performed by the concentration processing unit 83 is output (to the display unit 56 and the storage unit 57 (FIG. 3)) as a processing result image.

The parameter setting unit 84 sets pixels of one ommatidium image E #i (e.g., ommatidium image E1) located at a position designated by an operation performed by the user through a not-depicted operation unit, a predetermined application, or the like to focusing target pixels to be focused (to reflect the object), and supplies the focusing target pixels to the concentration processing unit 83 as a concentration parameter.

<Image Processing by Image Processing Unit 55>

Figure 18:
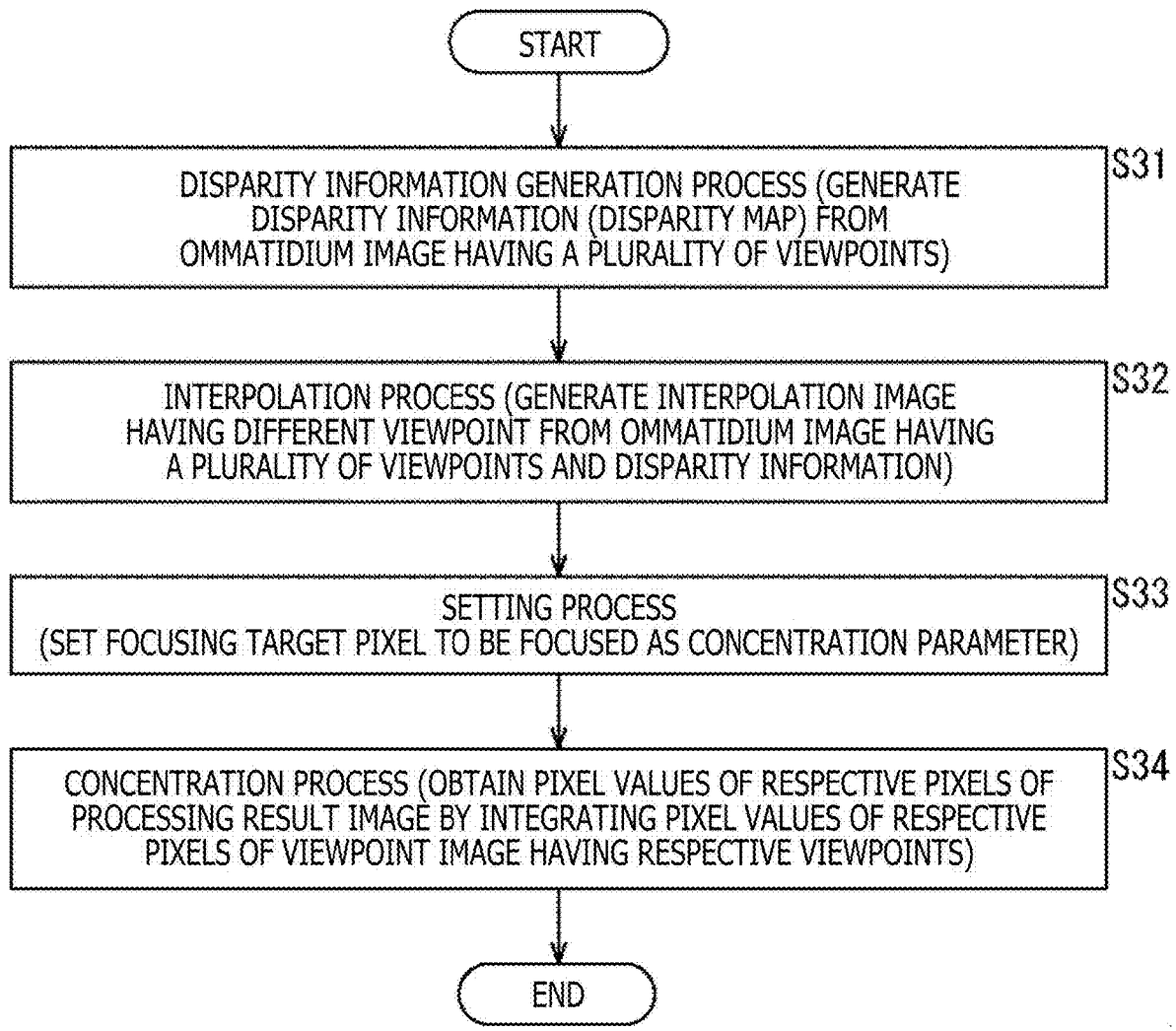
FIG. 18 is a flowchart explaining an example of image processing performed by the image processing unit 55.

FIG. 18 is a flowchart explaining an example of image processing performed by the image processing unit 55 in FIG. 17.

The image processing unit 55 supplies the ommatidium images E #i having a plurality of viewpoints, which are images having a plurality of viewpoints and supplied from the region identification unit 54, to the disparity information generation unit 81 and the interpolation unit 82.

In step S31, the disparity information generation unit 81 of the image processing unit 55 performs a disparity information generation process for obtaining disparity information using the ommatidium images E #i having a plurality of viewpoints and received from the region identification unit 54, and for generating a disparity map where the disparity information is registered.

The disparity information generation unit 81 supplies the disparity map obtained by the disparity information generation process to the interpolation unit 82 and the concentration processing unit 83, and the process proceeds from step S31 to step S32.

In step S32, the interpolation unit 82 performs an interpolation process for generating interpolation images having a plurality of viewpoints for interpolation other than the viewpoints of the ommatidium images E #i by using the ommatidium images E #i having a plurality of viewpoints and received from the region identification unit 54 and the disparity map received from the disparity information generation unit 81.

The interpolation unit 82 further supplies, to the concentration processing unit 83, the ommatidium images E #i having a plurality of viewpoints and received from the region identification unit 54, and the interpolation images having a plurality of viewpoints for interpolation and obtained by the interpolation process as viewpoint images having a plurality of viewpoints. Thereafter, the process proceeds from step S32 to step S33.

In step S33, the parameter setting unit 84 performs a setting process for setting, to focusing target pixels, pixels of the one viewpoint image (e.g., ommatidium image E1) located at a position designated by an operation by the user, for example.

The parameter setting unit 84 supplies (information indicating) the focusing target pixels obtained by the setting process to the concentration processing unit 83 as a concentration parameter, and the process proceeds from step S33 to step S34.

The focusing target pixels here is allowed to be set in accordance with designation by the user as described above, or by designation under an application, designation under rules determined beforehand, or others, for example. Pixels reflecting an object moving at a predetermined speed or higher, or an object continuously moving for a predetermined period or longer, for example, may be set to the focusing target pixels.

In step S34, the concentration processing unit 83 performs a concentration process corresponding to concentration of light from the object on a not-depicted virtual sensor by using the viewpoint images having a plurality of viewpoints and received from the interpolation unit 82, the disparity map received from the disparity information generation unit 81, and the focusing target pixels as the concentration parameter received from the parameter setting unit 84. Thereafter, the image processing by the image processing unit 55 ends.

The concentration processing unit 83 supplies a processing result image obtained as a result of the concentration process to the display unit 56.

Note that the entity of the virtual sensor on which the light is concentrated in the concentration process is a not-depicted memory, for example. In the concentration process, pixel values of an image obtained by concentration of light are obtained by integrating pixel values of the viewpoint images having a plurality of viewpoints with (storage values of) the memory which is the virtual sensor as luminance of light concentrated on the virtual sensor.

In the concentration process performed by the concentration processing unit 83, for generating the processing result image, respective pixel values of the processing result image focused on a focal point within an actual space are obtained by setting a reference shift amount BV described below as a pixel shift amount for shifting pixels of the viewpoint images having a plurality of viewpoints, and shifting and integrating the (pixel values of) the pixels of the viewpoint images having a plurality of viewpoints according to the reference shift amount BV.

The focal point here refers to an in-focus actual spatial point within the actual space. According to the concentration process performed by the concentration processing unit 83, a focal surface which is a surface as a collection of focal points is set using the focusing target pixels as the concentration parameter received from the parameter setting unit 84.

Note that the image processing unit 55 (FIG. 17) is allowed to include only the concentration processing unit 83.

For example, in a case where the concentration process by the concentration processing unit 83 is performed using the ommatidium images E #i captured by the region identification unit 54 without using interpolation images, the interpolation unit 82 may be eliminated from the image processing unit 55. However, in a case where the concentration process is performed using interpolation images in addition to the ommatidium images E #i, generation of ringing in an out-of-focus object can be reduced in the processing result image.

In addition, in a case where the disparity information associated with the ommatidium images E #i can be generated by an external apparatus using a distance sensor or the like, and acquired from the external apparatus, for example, the disparity information generation unit 81 may be eliminated from the image processing unit 55.

Moreover, in a case where the focal surface is set under a predetermined rule by the concentration processing unit 83, for example, the parameter setting unit 84 may be eliminated from the image processing unit 55.

Furthermore, the image processing unit 55 may be eliminated from the camera body 10.

<Another Configuration Example of Multi-Eye Interchangeable Lens>

Figure 19:
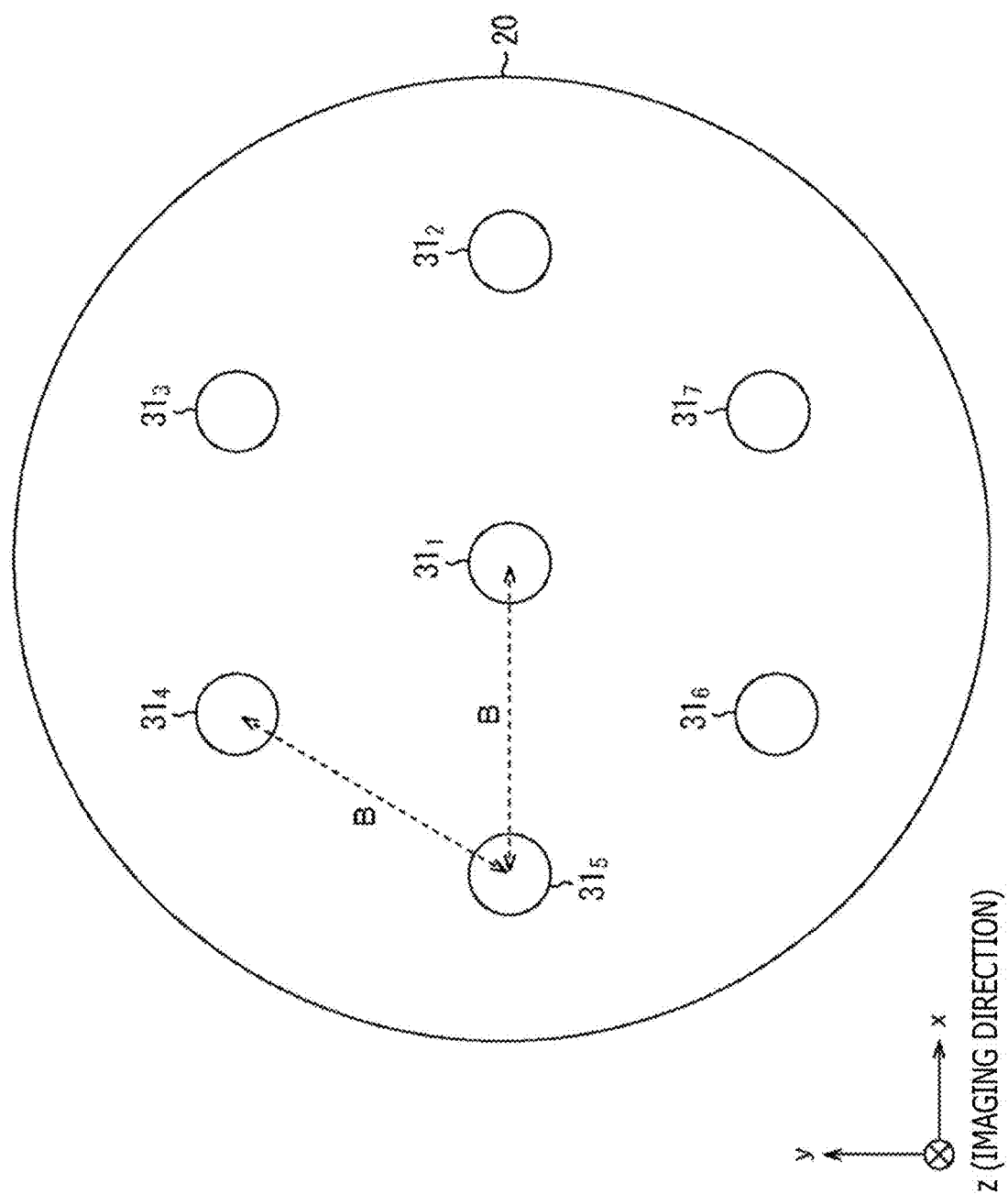
FIG. 19 is a rear view depicting another configuration example of the multi-eye interchangeable lens 20.

FIG. 19 is a rear view depicting another configuration example of the multi-eye interchangeable lens 20.

In FIG. 19, the multi-eye interchangeable lens 20 includes seven ommatidium lenses $31_1$ to $31_7$. The seven ommatidium lenses $31_1$ to $31_7$ are arranged in a two-dimensional plane without overlap in the optical axis direction.

Moreover, in FIG. 19, the seven ommatidium lenses $31_1$ to $31_7$ are disposed such that the six ommatidium lenses $31_2$ to $31_7$ are disposed around the ommatidium lens $31_1$ which is one of the seven ommatidium lenses $31_1$ to $31_7$, for example, in such a manner as to constitute vertexes of a regular hexagon centered at the ommatidium lens $31_1$.

Accordingly, in FIG. 19, a distance (between the optical axis) between any one ommatidium lens $31_i$ (i=1, 2, up to 7) included in the seven ommatidium lenses $31_1$ to $31_7$ and a different ommatidium lens $31_j$ (j=1, 2, up to 7) disposed closest to the ommatidium lens $31_i$ is a uniform distance B.

Described hereinafter will be an example of the multi-eye interchangeable lens 20 which includes the seven ommatidium lenses $31_1$ to $31_7$ as depicted in FIG. 19.

In a case where the multi-eye interchangeable lens 20 includes the seven ommatidium lenses $31_1$ to $31_7$ as described in FIG. 19, the ommatidium images E #i having a plurality of viewpoints and supplied from the region identification unit 54 (FIG. 3) to the disparity information generation unit 81 and the interpolation unit 82 of the image processing unit 55 are the ommatidium images E1 to E7 having seven viewpoints and corresponding to the seven ommatidium lenses $31_1$ to $31_7$.

<Generation of Interpolation Image>

Figure 20:
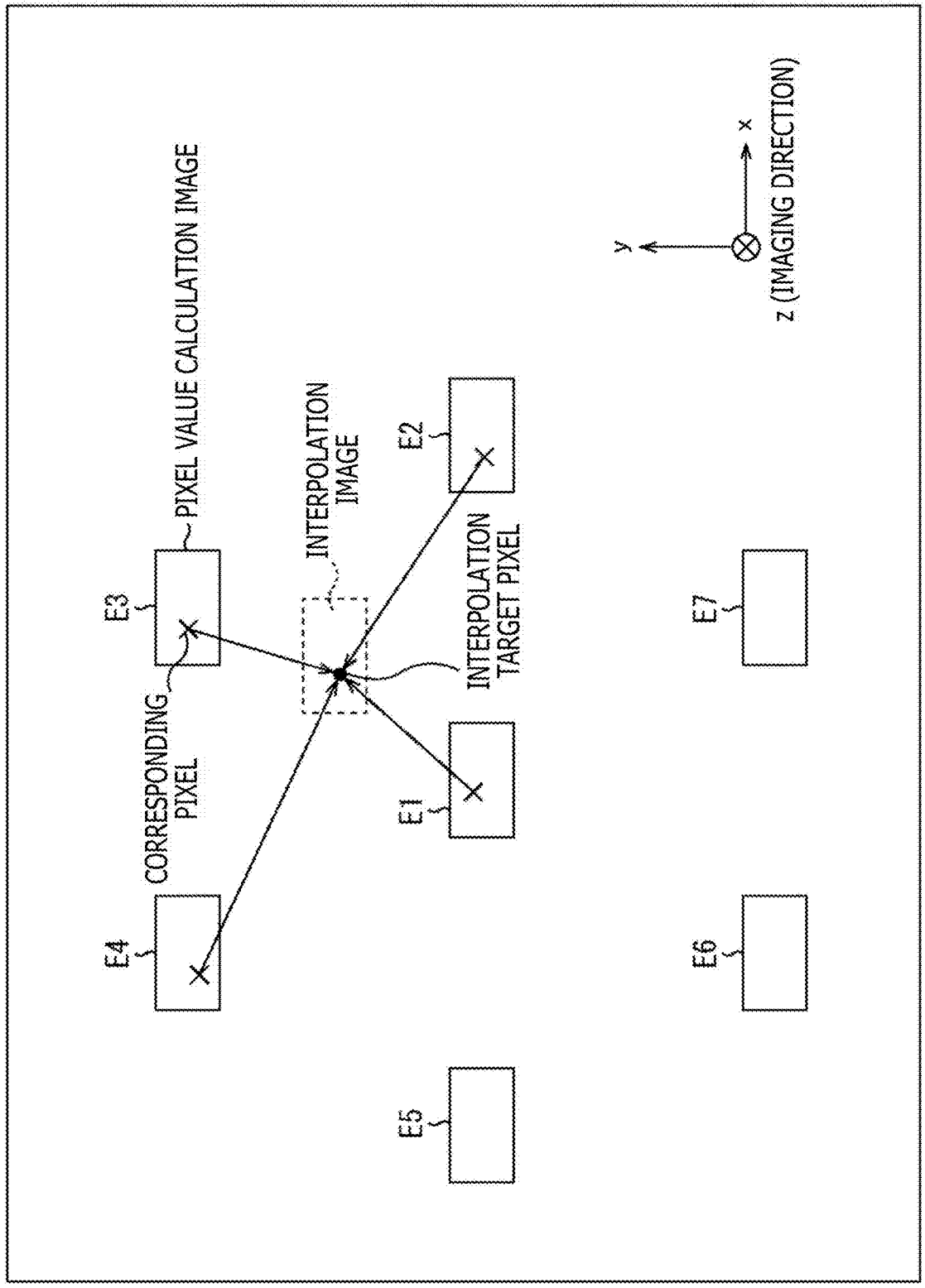
FIG. 20 is a diagram explaining an example of interpolation image generation performed by an interpolation unit 82.

FIG. 20 is a diagram explaining an example of interpolation image generation performed by the interpolation unit 82 in FIG. 17.

In a case of generation of an interpolation image having a certain viewpoint, the interpolation unit 82 sequentially selects a pixel of the interpolation image as an interpolation target pixel which is a target of interpolation. The interpolation unit 82 further selects all of the ommatidium images E1 to E7 having the seven viewpoints, or the ommatidium images E #i having a part (plurality) of viewpoints and disposed close to the viewpoint of the interpolation image as pixel value calculation images used for calculation of a pixel value of the interpolation target pixel. The interpolation unit 82 obtains, by using the disparity map received from the disparity information generation unit 81 and the viewpoint of the interpolation image, a corresponding pixel corresponding to the interpolation target pixel (pixel reflecting a spatial point identical to a spatial point which may be reflected at the interpolation target pixel if imaging is performed from the viewpoint of the interpolation image) from each of the ommatidium images E #i having a plurality of viewpoints and selected as the pixel value calculation images.

Thereafter, the interpolation unit 82 performs weighted addition of the pixel values of the corresponding pixels of the ommatidium images E #i having a plurality of viewpoints to obtain a weighted addition value thus obtained as a pixel value of the interpolation target pixel.

Adoptable as the weighting for the weighted addition of the pixel values of the corresponding pixels is a value inversely proportional to the distance between the viewpoint of each of the ommatidium images E #i as pixel value calculation images each having the corresponding pixel and the viewpoint of the interpolation image including the interpolation target pixel.

<Generation of Disparity Map>

Figure 21:
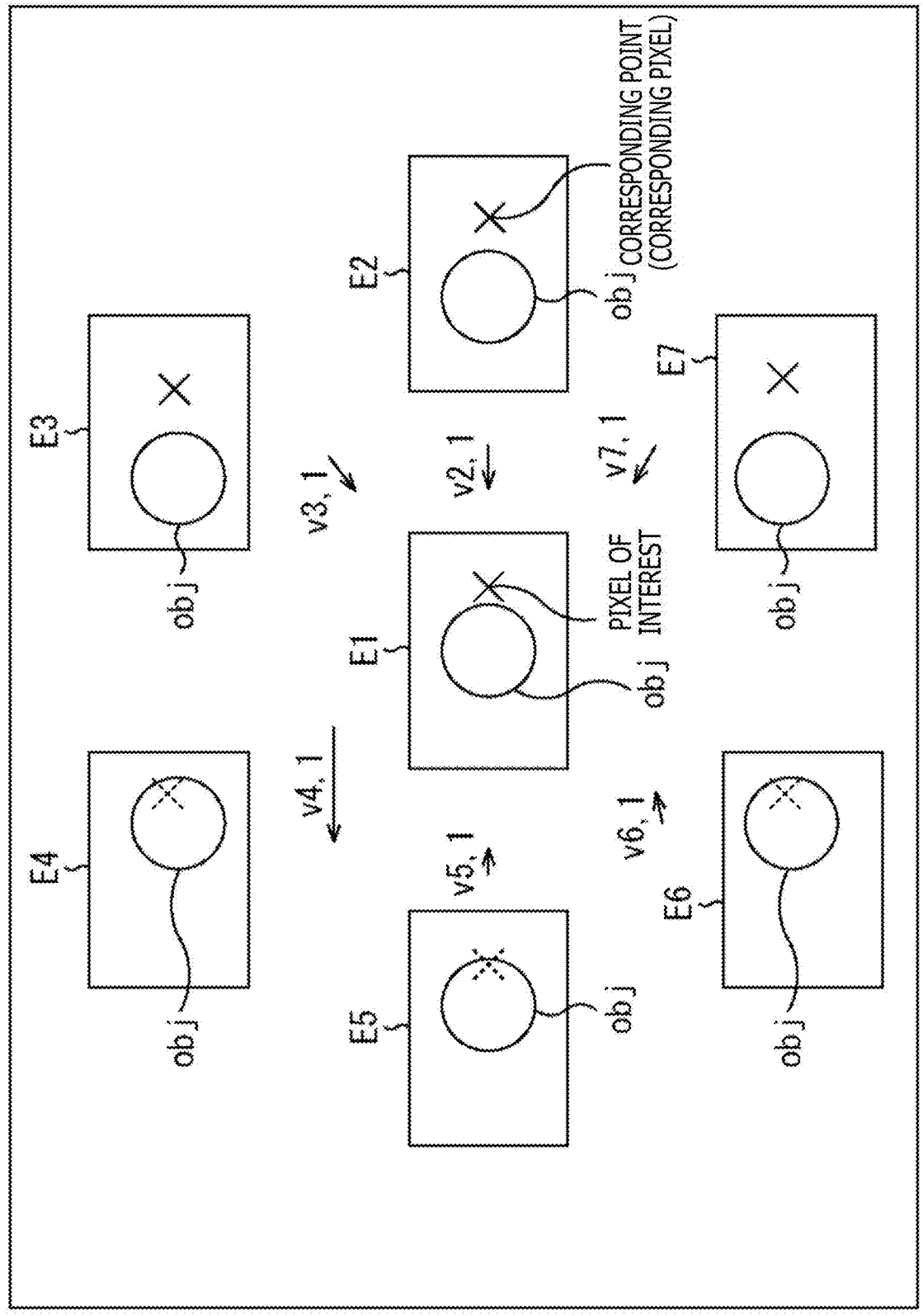
FIG. 21 is a diagram explaining an example of disparity map generation performed by a disparity information generation unit 81.

FIG. 21 is a diagram explaining an example of disparity map generation performed by the disparity information generation unit 81 in FIG. 17.

More specifically, FIG. 21 depicts an example of the ommatidium images E1 to E7 corresponding to the ommatidium lenses $31_1$ to $31_7$ of the region identification unit 54.

In FIG. 21, each of the ommatidium image E1 to E7 reflects a predetermined object obj as a foreground on the front side of a predetermined background. The respective ommatidium images E1 to E7 have different viewpoints, wherefore a position of the object obj reflected in each of the ommatidium images E2 to E7 (position on the ommatidium image) is shifted from the position of the object obj reflected in the ommatidium image E1 by an amount of a difference between the viewpoints, for example.

It is here assumed that the viewpoint (position) of the ommatidium lens $31_i$, i.e., the viewpoint of the ommatidium image E #i corresponding to the ommatidium lens $31_i$ is expressed as vp #i.

For example, in a case of generation of a disparity map for a viewpoint vp1 of the ommatidium image E1, the disparity information generation unit 81 designates the ommatidium image E1 as an image of interest E1 to which attention is paid. In addition, the disparity information generation unit 81 sequentially selects respective pixels of the image of interest E1 as a pixel of interest to which attention is paid, and detects a corresponding pixel (corresponding point) corresponding to the pixel of interest from each of the other ommatidium images E2 to E7.

For example, a method utilizing a triangulation principle such as stereo matching and multi-base line stereo is available as a method for detecting the corresponding pixel corresponding to the pixel of interest of the image of interest E1 from each of the ommatidium images E2 to E7.

A vector representing a positional shift of the corresponding pixel of the ommatidium image E #i with respect to the pixel of interest of the image of interest E1 is here referred to as a disparity vector v #i,1.

The disparity information generation unit 81 obtains disparity vectors v2,1 to v7,1 for the ommatidium images E2 to E7, respectively. Subsequently, for example, the disparity information generation unit 81 determines the size of the disparity vector v #i,1 by majority decision of the sizes of the disparity vectors v2,1 to v7,1, and obtains the determined size as the size of the disparity (at the position) of the pixel of interest.

In a case where the distance between the ommatidium lens 31$_1$ having acquired the image of interest E1 and each of the ommatidium lenses 31$_2$ to 31$_7$ having acquired the ommatidium images E2 to E7 is the uniform distance B at the region identification unit 54 as described with reference to FIG. 19, vectors having different directions but having a uniform size are obtained as the disparity vectors v2,1 to v7,1 when an actual spatial point reflected at the pixel of interest of the image of interest E1 is also reflected in each of the ommatidium images E2 to E7.

More specifically, in this case, the disparity vectors v2,1 to v7,1 become vectors having a uniform size and directions opposite to the directions of the other viewpoints vp2 to vp7 of the ommatidium images E2 to E7 with respect to the viewpoint vp1 of the image of interest E1.

Note that any one of the ommatidium images E2 to E7 may be an image where occlusion is produced, i.e., may be an image where the actual spatial point reflected at the pixel of interest in the image of interest E1 is located behind the foreground and not reflected.

A correct pixel as the corresponding pixel corresponding to the pixel of interest is difficult to detect from the ommatidium image E #i where the actual spatial point reflected at the pixel of interest in the image of interest E1 is not reflected (hereinafter also referred to as occlusion image).

Accordingly, obtained for the occlusion image E #i is a disparity vector v #i,1 having a size different from a size of a disparity vector v #j,1 of an ommatidium image E #j reflecting the actual spatial point reflected at the pixel of interest in the image of interest E1.

It is estimated that the number of images where occlusion is produced at the pixel of interest is smaller than the number of images where occlusion is not produced in the ommatidium images E2 to E7. Accordingly, as described above, the disparity information generation unit 81 determines the size of the disparity vector v #i,1 by majority decision of the sizes of the disparity vectors v2,1 to v7,1, and obtains the determined size as the size of the disparity of the pixel of interest.

In FIG. 21, the three disparity vectors v2,1, v3,1, and v7,1 included in the disparity vectors v2,1 to v7,1 are vectors having a uniform size. Meanwhile, the disparity vectors v4,1, v5,1, and v6,1 are not disparity vectors having a uniform size.

Accordingly, the size of the three disparity vectors v2,1, v3,1, and v7,1 is obtained as the size of the disparity of the pixel of interest.

Note that the direction of the disparity between the pixel of interest in the image of interest E1 and any ommatidium image E #i is recognizable from a positional relationship (the direction from the viewpoint vp1 to the viewpoint vp #i or the like) between the viewpoint vp1 of the image of interest E1 (the position of the ommatidium lens 31$_1$) and the viewpoint vp #i of the ommatidium image E #i (the position of the ommatidium lens 31$_1$).

The disparity information generation unit 81 sequentially selects the respective pixels in the image of interest E1 as the pixel of interest, and obtains the disparity size. Thereafter, the disparity information generation unit 81 generates a disparity map which is a map where a size of a disparity for each position (x-y coordinates) of the pixels in the image of interest E1 is registered. Accordingly, the disparity map is a map (table) where a position of a pixel and a size of a disparity of the corresponding pixel are associated with each other.

Disparity maps for the viewpoints vp #i of the other ommatidium images E #i can be generated in a manner similar to the manner of generation of the disparity map for the viewpoint vp1.

However, for generation of the disparity maps of the viewpoints vp #i other than the viewpoint vp1, the majority decision of the disparity vector is made with adjustment of the size of the disparity vector on the basis of a positional relationship between the viewpoint vp #i of the ommatidium image E #i and the viewpoint vp #j of the ommatidium image E #j other than the ommatidium image E #i (positional relationship between the ommatidium lenses 31$_1$ and 31*j*) (distance between the viewpoint vp #i and the viewpoint vp #j).

More specifically, in a case where a disparity map is generated with the ommatidium image E5 designated as the image of interest, for example, a disparity vector obtained between the image of interest E5 and the ommatidium image E2 has a size twice larger than the size of the disparity vector obtained between the image of interest E5 and the ommatidium image E1.

This size difference is produced for a following reason. A base line length which is a distance between the optical axis of the ommatidium lens 31$_5$ acquiring the image of interest E5 and the optical axis of the ommatidium lens 31$_1$ obtaining the ommatidium image E1 is the distance B, while a base line length between the ommatidium lens 31$_5$ acquiring the image of interest E5 and the ommatidium lens 31$_2$ acquiring the ommatidium image E2 is a distance 2B.

Accordingly, for example, it is assumed here that the distance B which is the base line length between the ommatidium lens 31$_1$ and the different ommatidium lens 31$_i$ is referred to as a reference base line length which is a reference for obtaining a disparity. Majority decision of a disparity vector is made with size adjustment of the disparity vector in such a manner as to achieve conversion of a base line length into the reference base line length B.

More specifically, for example, the base line length B between the ommatidium lens 31$_5$ acquiring the image of interest E5 and the ommatidium lens 31$_1$ acquiring the ommatidium image E1 is equal to the reference base line length B. Accordingly, a disparity vector obtained between the image of interest E5 and the ommatidium image E1 is adjusted such that the size of this disparity vector becomes 1 time larger.

Moreover, for example, the base line length 2B between the ommatidium lens 31$_5$ acquiring the image of interest E5 and the ommatidium lens 31$_2$ acquiring the ommatidium image E2 is equal to a length twice larger than the reference base line length B. Accordingly, a disparity vector obtained between the image of interest E5 and the ommatidium image E2 is adjusted such that the size of this disparity vector becomes ½ times larger, where ½ is a value of a ratio of the reference base line length B to the base line length 2B between the ommatidium lens 31$_5$ and the ommatidium lens 31$_2$.

A size of a disparity vector obtained between the image of interest E5 and each of the other ommatidium images E #i is similarly adjusted to a ratio value times larger, which value is a ratio to the reference base line length B.

Thereafter, a majority decision of the disparity vector is made using the disparity vectors after the size adjustment.

Note that the disparity of (each pixel) of the ommatidium images E #i is allowed to be obtained at the disparity information generation unit 81 using accuracy of the pixels of the ommatidium images, for example. In addition, for example, the disparity of the ommatidium images E #i is allowed to be obtained by sub-pixel accuracy which is accuracy finer than the accuracy of each pixel of the ommatidium images E #i (e.g., accuracy of sub-pixel such as ¼ pixel).

In a case where a disparity is obtained with sub-pixel accuracy, the disparity of the sub-pixel accuracy may be used without change, or converted into an integer by rounding up, rounding down, or rounding off after the decimal point of the disparity of the sub-pixel accuracy.

The size of the disparity registered in the disparity map will be hereinafter also referred to as a registration disparity. For example, in a case of representation of a vector as a disparity in a two-dimensional coordinate system which has an x-axis extending from the left to the right, and a y-axis extending from the bottom to the top, the registration disparity is equivalent to an x component of a disparity between each pixel of the ommatidium image E1 and the ommatidium image E5 having an adjacent viewpoint to the left of the ommatidium image E1 (a vector representing a pixel shift from a pixel of the ommatidium image E1 to a corresponding pixel of the ommatidium image E5 as a pixel corresponding to the pixel of the ommatidium image E1).

<Refocusing by Concentration Process>

Figure 22:
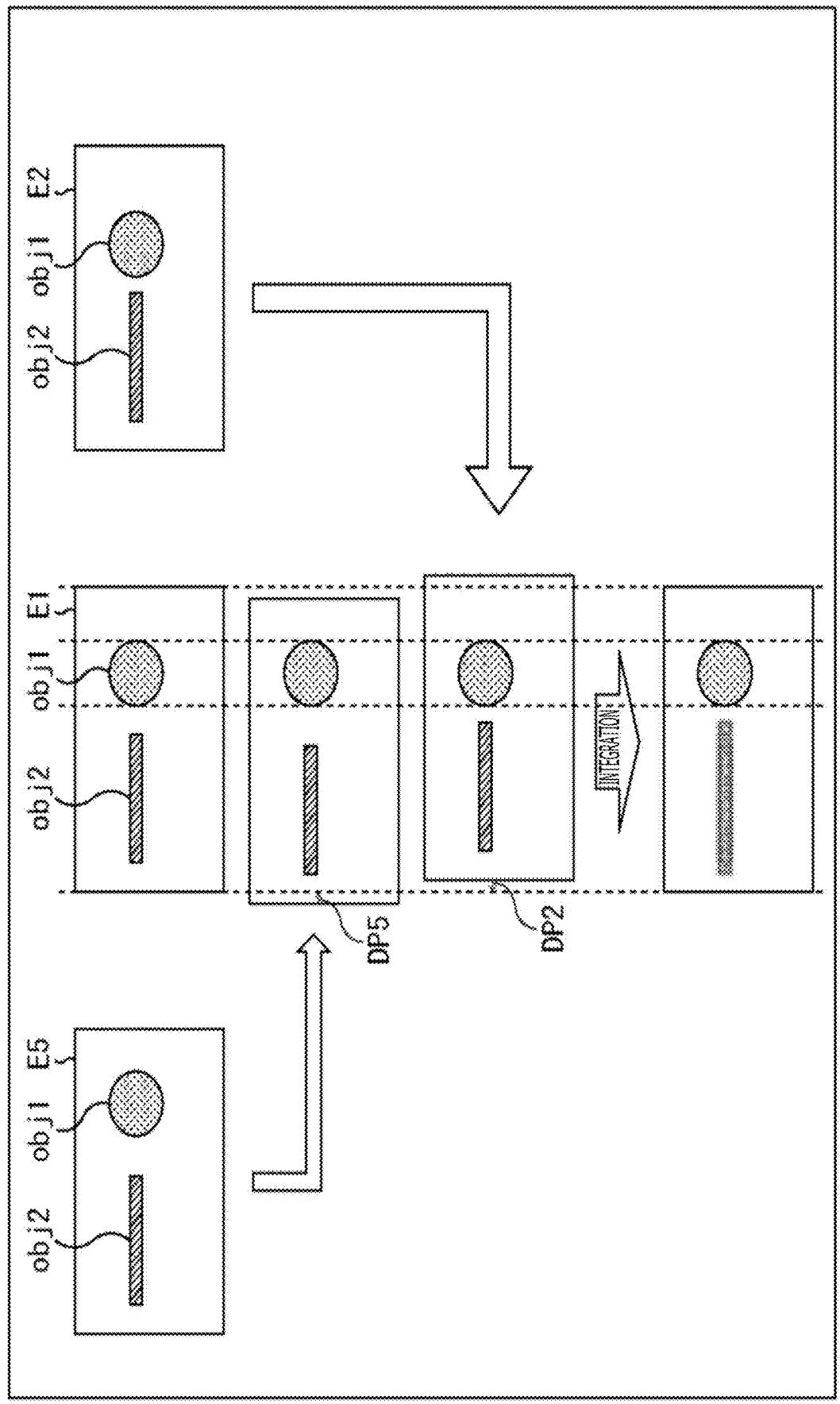
FIG. 22 is a diagram explaining an outline of refocusing achieved by a concentration process performed by a concentration processing unit 83.

FIG. 22 is a diagram explaining an outline of refocusing achieved by a concentration process performed by the concentration processing unit 83 in FIG. 17.

Note that the three images, i.e., the ommatidium image E1, the ommatidium image E2 having an adjacent viewpoint to the right of the ommatidium image E1, and the ommatidium image E5 having an adjacent viewpoint to the left of the ommatidium image E1, are used as the viewpoint images having a plurality of the viewpoints and used for the concentration process in FIG. 22 for simplifying the description.

In FIG. 22, each of the ommatidium images E1, E2, and E5 reflects two objects obj1 and obj2. For example, the object obj1 is located on the front side, while the object obj2 is located on the rear side.

For example, it is assumed here that an image as viewed from the viewpoint of the ommatidium image E1 is obtained as a processing result image after refocusing by performing refocusing for focusing (adjusting a focus) on the object obj1.

A disparity of the viewpoint of the processing result image (the viewpoint of the ommatidium image E1 here) from the pixel included in the ommatidium image E1 and reflecting the object obj1 is here referred to as a DP1. Moreover, a disparity of the viewpoint of the processing result image from the pixel included in the ommatidium image E2 and reflecting the object obj1 is referred to as a DP2, while a disparity of the viewpoint of the processing result image from the pixel including in the ommatidium image E5 and reflecting the object obj1 is referred to as a DP5.

Note that the viewpoint of the processing result image is equivalent to the viewpoint of the ommatidium image E1 in FIG. 22. Accordingly, the disparity DP1 of the viewpoint of the processing result image from the pixel included in the ommatidium image E1 and reflecting the object obj1 has a value of (0, 0).

Concerning the ommatidium images E1, E2, and E5, pixels of the ommatidium images E1, E2, and E5 are shifted according to the disparities DP1, DP2, and DP5, and the ommatidium images E1, E2, and E5 after the pixel shift are integrated. In this manner, the processing result image focused on the object obj1 can be obtained.

More specifically, the positions of the pixels included in the ommatidium images E1, E2, and E5 after the pixel shift and reflecting the object obj1 are matched with each other by shifting the pixels of the ommatidium images E1, E2, and E5 in such a manner as to cancel the disparities DP1, DP2, and DP5 (in directions opposite to the disparities DP1, DP2, and DP5).

Accordingly, the processing result image focused on the object obj1 can be obtained by integrating the ommatidium images E1, E2, and E5 after the pixel shift.

Note that the positions of the pixels included in the ommatidium images E1, E2, and E5 after the pixel shift and each reflecting the object obj2 located at a position different from the position of the object obj1 in the depth direction do not match each other. Accordingly, the object obj2 reflected in the processing result image is blurred.

Moreover, as described above, the viewpoint of the processing result image here is the viewpoint of the ommatidium image E1, and the disparity DP1 has the value (0, 0). Accordingly, substantially no pixel shift is needed for the ommatidium image E1.

For example, in the concentration process performed at the concentration processing unit 83, an image refocused on a focusing target is obtained as the processing result image by shifting the pixels of each of the viewpoint images having a plurality of viewpoints in such a manner as to cancel the disparity of the viewpoint of the processing result image (the viewpoint of the ommatidium image E1 here) from the focusing target pixel reflecting the focusing target, and integrating the shifted pixels as described above.

<Disparity Conversion>

Figure 23:
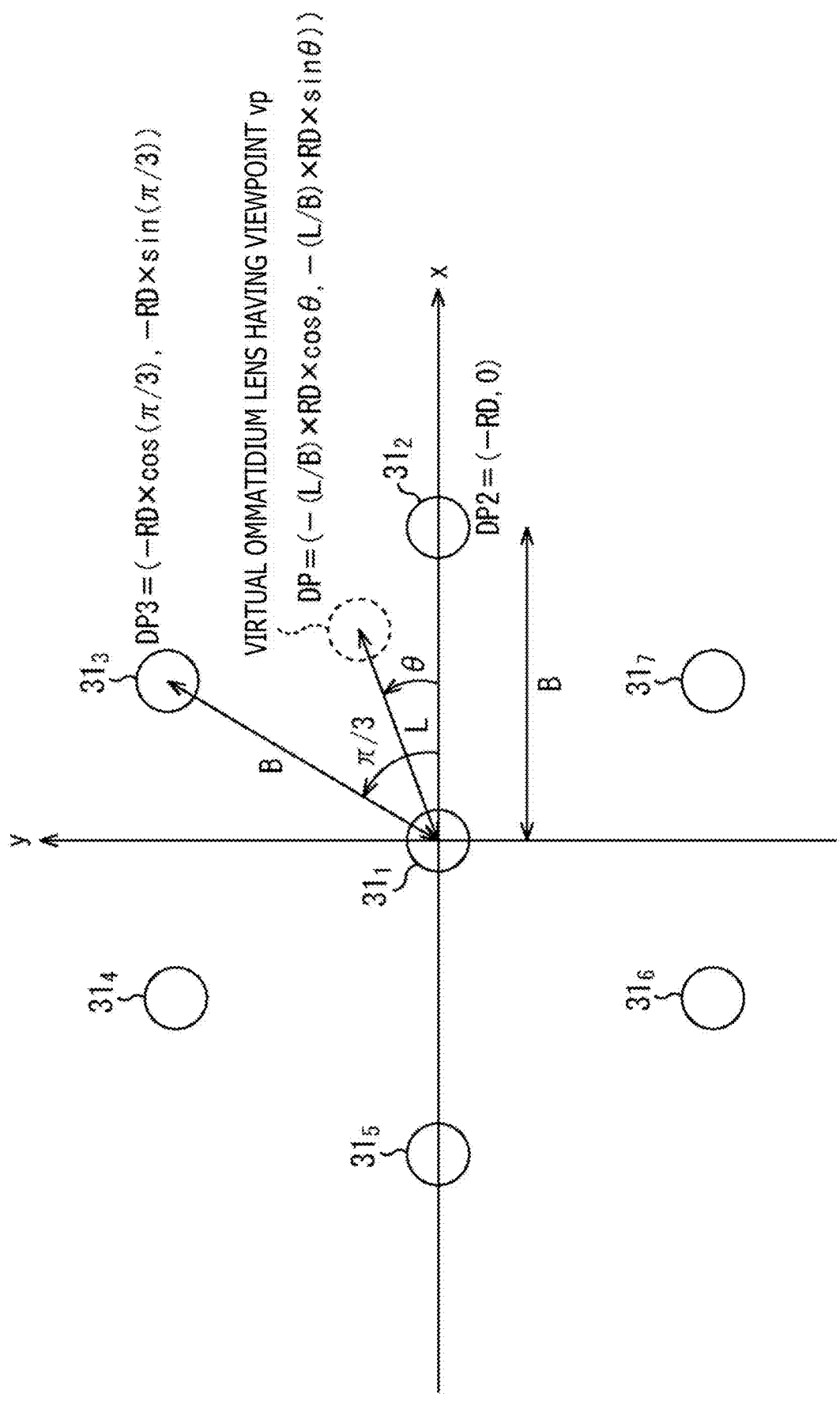
FIG. 23 is a diagram explaining an example of disparity conversion.

FIG. 23 is a diagram explaining an example of disparity conversion.

As described with reference to FIG. 21, a registration disparity registered in the disparity map is equivalent to an x component of a disparity of a pixel in the ommatidium image E1 from respective pixels of the ommatidium image E5 having the adjacent viewpoint to the left of the ommatidium image E1 in a part other than a region where occlusion is produced.

In refocusing, pixels of a viewpoint image need to be shifted in such a manner as to cancel a disparity of a focusing target pixel.

When attention is paid to a certain viewpoint as a viewpoint of interest here, a disparity of a focusing target pixel of a processing result image from a viewpoint image having the viewpoint of interest, i.e., a disparity of the focusing target pixel of the ommatidium image E1 here, for example, is needed to achieve the pixel shift of the viewpoint image having the viewpoint of interest in refocusing.

The disparity of the focusing target pixel of the ommatidium image E1 from the viewpoint image having the viewpoint of interest can be obtained in consideration of the direction from the viewpoint of the processing result image to the viewpoint of interest on the basis of the registration disparity of the focusing target pixel of the ommatidium image E1 (the corresponding pixel of the ommatidium image E1 as a pixel corresponding to the focusing target pixel of the processing result image).

It is assumed here that the direction to the viewpoint of interest from the viewpoint of the ommatidium image E1 as the viewpoint of the processing result image is expressed by an anticlockwise angle with the x axis set to 0 [radian].

For example, the ommatidium lens $31_2$ is located away from the viewpoint of the ommatidium image E1 as the viewpoint of the processing result image by the reference base line length B in the +x direction. The direction from the viewpoint of the ommatidium image E1 as the viewpoint of the processing result image to the viewpoint of the ommatidium image E2 corresponding to the ommatidium lens $31_2$ is 0 [radian]. In this case, (the vector as) the disparity DP2 of the focusing target pixel of the ommatidium image E1 from the ommatidium image E2 (viewpoint image) corresponding to the ommatidium lens $31_2$ can be obtained by $(-RD, 0) = (-(B/B) \times RD \times \cos 0, -(B/B) \times RD \times \sin 0)$ on the basis of a registration disparity RD of the focusing target pixel in consideration of 0 [radian] which is the direction of the viewpoint of the ommatidium image E2 corresponding to the ommatidium lens $31_2$.

In addition, for example, the ommatidium lens $31_3$ is located away from the viewpoint of the ommatidium image E1 as the viewpoint of the processing result image by the reference base line length B in a direction of $\pi/3$. The direction from the viewpoint of the ommatidium image E1 as the viewpoint of the processing result image to the viewpoint of the ommatidium image E3 corresponding to the ommatidium lens $31_3$ is $\pi/3$ [radian]. In this case, (the vector as) the disparity DP3 of the focusing target pixel of the ommatidium image E1 from the ommatidium image E3 corresponding to the ommatidium lens $31_3$ can be obtained by $(-RD \times \cos(\pi/3), -RD \times \sin(\pi/3)) = (-(B/B) \times RD \times \cos(\pi/3), -(B/B) \times RD \times \sin(\pi/3))$ on the basis of the registration disparity RD of the focusing target image in consideration of $\pi/3$ [radian] which is the direction of the viewpoint of the ommatidium lens $31_3$.

An interpolation image obtained at the interpolation unit 82 here can be considered as an image captured by a virtual lens located at a viewpoint vp of the interpolation image. It is assumed that the viewpoint vp of the image captured by this virtual lens is located at a position away from the viewpoint of the ommatidium image E1 as the viewpoint of the processing result image by a distance L in a direction of an angle $\theta$ [radian]. In this case, the disparity DP of the focusing target pixel of the ommatidium image E1 from the viewpoint image having the viewpoint vp (the image captured by the virtual lens) can be obtained as $(-(L/B) \times RD \times \cos \theta, -(L/B) \times RD \times \sin \theta)$ on the basis of the registration disparity RD of the focusing target pixel in consideration of the angle $\theta$ which is the direction of the viewpoint vp.

Obtaining the disparity of the pixel of the ommatidium image E1 from the viewpoint image having the viewpoint of interest on the basis of the registration disparity RD in consideration of the direction of the viewpoint of interest, i.e., conversion of the registration disparity RD into the disparity of the pixel of the ommatidium image E1 (the pixel of the processing result image) from the viewpoint image having the viewpoint of interest as described above is also referred to as disparity conversion.

In refocusing, a disparity of a focusing target pixel of the ommatidium image E1 from each of viewpoint images having respective viewpoints is obtained by disparity conversion on the basis of the registration disparity RD of the focusing target pixel. Pixels of the viewpoint images having the respective viewpoints are shifted in such a manner as to cancel the disparity of the focusing target pixel.

In refocusing, the pixels of each of the viewpoint images are shifted in such a manner as to cancel the disparity of the focusing target pixel from the corresponding viewpoint image. A shift amount of this pixel shift is also referred to as a focusing shift amount.

A viewpoint of an ith viewpoint image included in viewpoint images having a plurality of viewpoints obtained by the interpolation unit 82 is hereinafter also expressed as a viewpoint vp #i. The focusing shift amount of the viewpoint image having the viewpoint vp #i is also expressed as a focusing shift amount SV #i.

The focusing shift amount SV #i of the viewpoint image having the viewpoint vp #i can uniquely be obtained by disparity conversion on the basis of the registration disparity RD of the focusing target pixel in consideration of the direction of the viewpoint vp #i from the viewpoint of the ommatidium image E1 as the viewpoint of the processing result image.

In the disparity conversion here, (a vector as) a disparity $(-(L/B) \times RD \times \cos \theta, -(L/B) \times RD \times \sin \theta)$ can be obtained from the registration disparity RD as described above.

Accordingly, for example, the disparity conversion can be considered as calculation which multiplies the registration disparity RD by each of $-(L/B) \times \cos \theta$ and $-(L/B) \times \sin \theta$, calculation which multiplies a value of $-1$ time larger than the registration disparity RD by each of $(L/B) \times \cos \theta$ and $(L/B) \times \sin \theta$, or the like.

For example, the disparity conversion is here considered as calculation which multiplies a value $-1$ of time larger than the registration disparity RD by each of $(L/B) \times \cos \theta$ and $(L/B) \times \sin \theta$.

In this case, a value as a target of the disparity conversion, i.e., the value of $-1$ time larger than the registration disparity RD is a value as a reference for obtaining the focusing shift amounts of the viewpoint images having respective viewpoints, and is hereinafter also referred to as a reference shift amount BV.

The focusing shift amount is uniquely determined by the disparity conversion of the reference shift amount BV. Accordingly, in refocusing, a setting of the reference shift amount BV substantially sets a pixel shift amount associated with the shift of the pixels in the viewpoint images having respective viewpoints.

Note that the reference shift amount BV for focusing the focusing target pixel, i.e., the value of $-1$ time larger than the registration disparity RD of the focusing target pixel is equivalent to the x component of the disparity of the focusing target pixel from the ommatidium image E2 in a case where the value of $-1$ time larger than the registration disparity RD is adopted as the reference shift amount BV as described above.

<Concentration Process for Refocusing>

Figure 24:
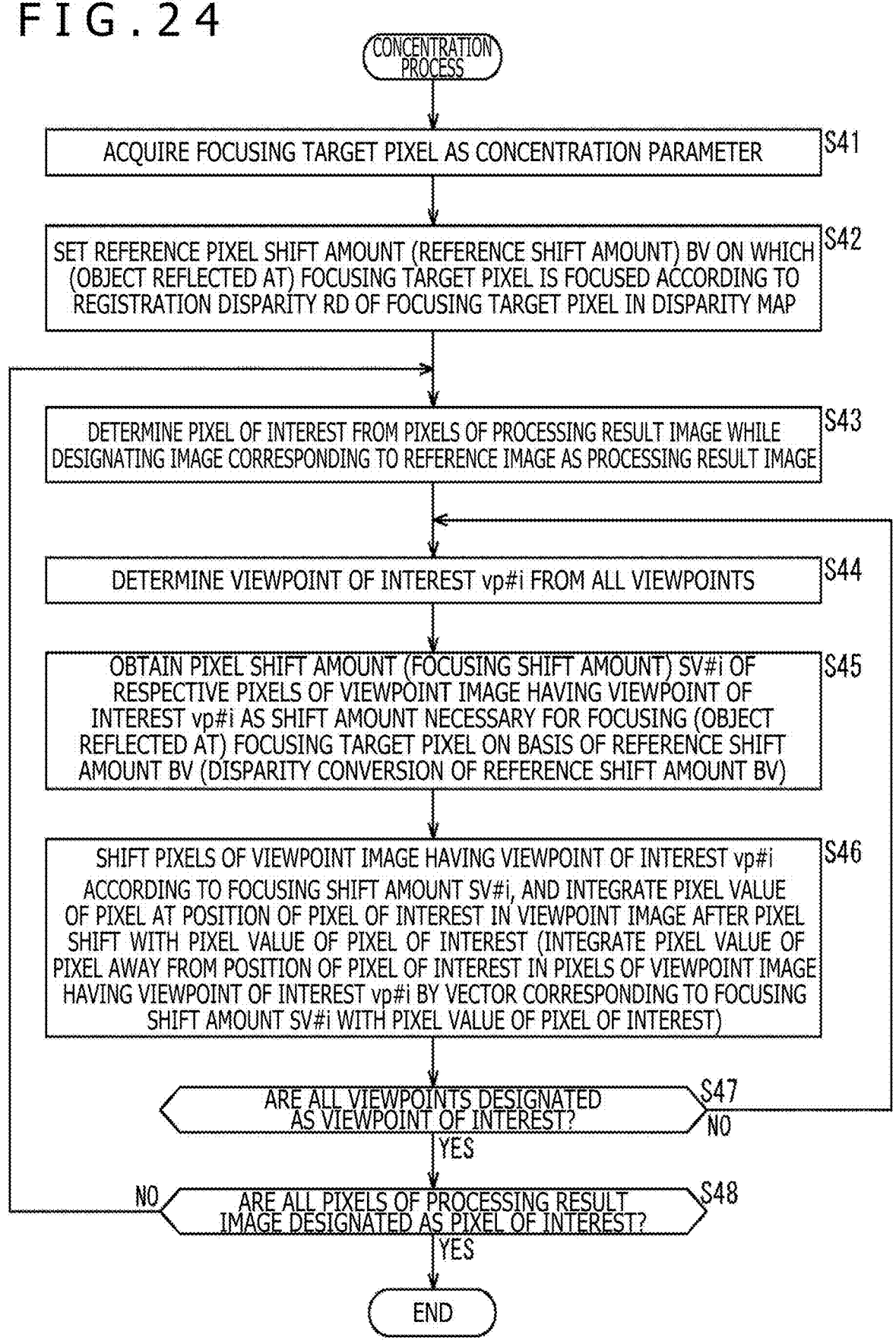
FIG. 24 is a flowchart explaining an example of a concentration process performing refocusing.

FIG. 24 is a flowchart explaining an example of a concentration process for performing refocusing.

In step S41, the concentration processing unit 83 acquires (information indicating) a focusing target pixel as a concentration parameter from the parameter setting unit 84, and the process proceeds to step S42.

More specifically, for example, the ommatidium image E1 or the like included in the ommatidium images E1 to E7 corresponding to the ommatidium lenses $31_1$ to $31_7$ is displayed on the display unit 56. When the user designates one position on the ommatidium image E1, the parameter setting unit 84 sets a pixel located at the position designated by the user as a focusing target pixel, and supplies (information indicating) the focusing target pixel to the concentration processing unit 83 as a concentration parameter.

In step S41, the concentration processing unit 83 acquires the focusing target pixel supplied from the parameter setting unit 84 in the manner described above.

In step S42, the concentration processing unit 83 acquires the registration disparity RD corresponding to the focusing target pixel and registered in a disparity map received from the disparity information generation unit 81. Thereafter, the concentration processing unit 83 sets the reference shift amount BV according to the registration disparity RD of the focusing target pixel, i.e., sets a value of −1 time larger than the registration disparity RD of the focusing target pixel to the reference shift amount BV, for example. The process then proceeds from step S42 to step S43.

In step S43, the concentration processing unit 83 sets one of images having a plurality of viewpoints received from the interpolation unit 82, such as an image corresponding to the ommatidium image E1, i.e., an image having the same size as that of the ommatidium image E1, viewed from the viewpoint of the ommatidium image E1, and having an initial value of 0 as a pixel value, to a processing result image. The concentration processing unit 83 further selects one of pixels each not yet determined as a pixel of interest from the pixels of the processing result image, and determines the selected pixel as a pixel of interest. Thereafter, the process proceeds from step S43 to step S44.

In step S44, the concentration processing unit 83 selects one of viewpoints not yet determined as a viewpoint of interest (for the pixel of interest) from viewpoints of viewpoint images received from the interpolation unit 82, and determines the selected viewpoint vp #i as the viewpoint of interest vp #i. Thereafter, the process proceeds to step S45.

In step S45, the concentration processing unit 83 obtains, on the basis of the reference shift amount BV, the focusing shift amount SV #i of each of the pixels of the viewpoint image having the viewpoint of interest vp #i as a value necessary for focusing the focusing target pixel (focusing on an object reflected at the focusing target pixel).

More specifically, the concentration processing unit 83 converts the reference shift amount BV by disparity conversion in consideration of the direction to the viewpoint of interest vp #i from the viewpoint of the ommatidium image E1 as the viewpoint of the processing result image, and acquires a value (vector) resulting from the disparity conversion as the focusing shift amount SV #i of the respective pixels of the viewpoint image having the viewpoint of interest vp #i.

Thereafter, the process proceeds from step S45 to step S46. The concentration processing unit 83 shifts the respective pixels of the viewpoint image having the viewpoint of interest vp #i according to the focusing shift amount SV #i, and integrates a pixel value of a pixel at the position of the pixel of interest included in the viewpoint image after the pixel shift with the pixel value of the pixel of interest.

More specifically, the concentration processing unit 83 integrates a pixel value of a pixel included in the pixels of the viewpoint image having the viewpoint of interest vp #i and located away from the position of the pixel of interest by a vector corresponding to the focusing shift amount SV #i (e.g., a value of −1 time larger than the focusing shift amount SV #i here) with the pixel value of the pixel of interest.

Thereafter, the process proceeds from step S46 to step S47, and the concentration processing unit 83 determines whether all of the viewpoints of the viewpoint images received from the interpolation unit 82 have been designated as the viewpoint of interest.

In a case where not all of the viewpoints of the viewpoint images received from the interpolation unit 82 are yet determined as the viewpoint of interest in step S47, the process returns to step S44. Thereafter, similar processing is repeated.

On the other hand, in a case where all of the viewpoints of the viewpoint images received from the interpolation unit 82 have been determined as the viewpoint of interest in step S47, the process proceeds to step S48.

In step S48, the concentration processing unit 83 determines whether all of the pixels of the processing result image have been designated as the pixel of interest.

In a case where not all of the pixels of the processing result image are yet determined as the pixel of interest in step S48, the process returns to step S43. The concentration processing unit 83 newly determines one of the pixels included in the processing result image and not yet determined as the pixel of interest, and hereinafter repeats similar processing as described above.

In a case where all of the pixels of the processing result image have been determined as the pixel of interest in step S48, the concentration processing unit 83 outputs the processing result image and ends the concentration process.

Note that the concentration process in FIG. 24 generates, using viewpoint images having a plurality of viewpoints, a processing result image focused on an object located on a focal surface (in the vicinity of the focal surface) which is a plane having a constant (unchangeable) distance in the depth direction within the actual space.

According to the concentration process in FIG. 24 as described above, the reference shift amount BV is set according to the registration disparity RD of the focusing target pixel, and is not changeable with the pixel of interest or the viewpoint of interest vp #i. Accordingly, the reference shift amount BV in the concentration process in FIG. 24 is set regardless of the pixel of interest or the viewpoint of interest vp #i.

In addition, the focusing shift amount SV #i is changeable according to the viewpoint of interest vp #i and the reference shift amount BV. However, as described above, the reference shift amount BV in the concentration process in FIG. 24 is not changeable with the pixel of interest or the viewpoint of interest vp #i. Accordingly, the focusing shift amount SV #i is changeable with the viewpoint of interest vp #i, but is not changeable with the pixel of interest. More specifically, the focusing shift amount SV #i has an identical value for each of the pixels of the viewpoint image having one viewpoint regardless of the pixel of interest.

In FIG. 24, the process in step S45 for obtaining the focusing shift amount SV #i constitutes a loop (loop from step S43 to step S48) for repeatedly calculating the focusing shift amount SV #i for the identical viewpoint vp #i associated with different pixels of interest. However, as described above, the focusing shift amount SV #i has an identical value for each of pixels of a viewpoint image having one viewpoint regardless of the pixel of interest.

Accordingly, the process in step S45 for obtaining the focusing shift amount SV #i in FIG. 24 is required to be performed only once for one viewpoint.

<Lens Position Information, Lens Shading Information, Exit Pupil Position Information, and Exit Pupil Diameter Information, or Total Shading Information Using Server>

Figure 25:
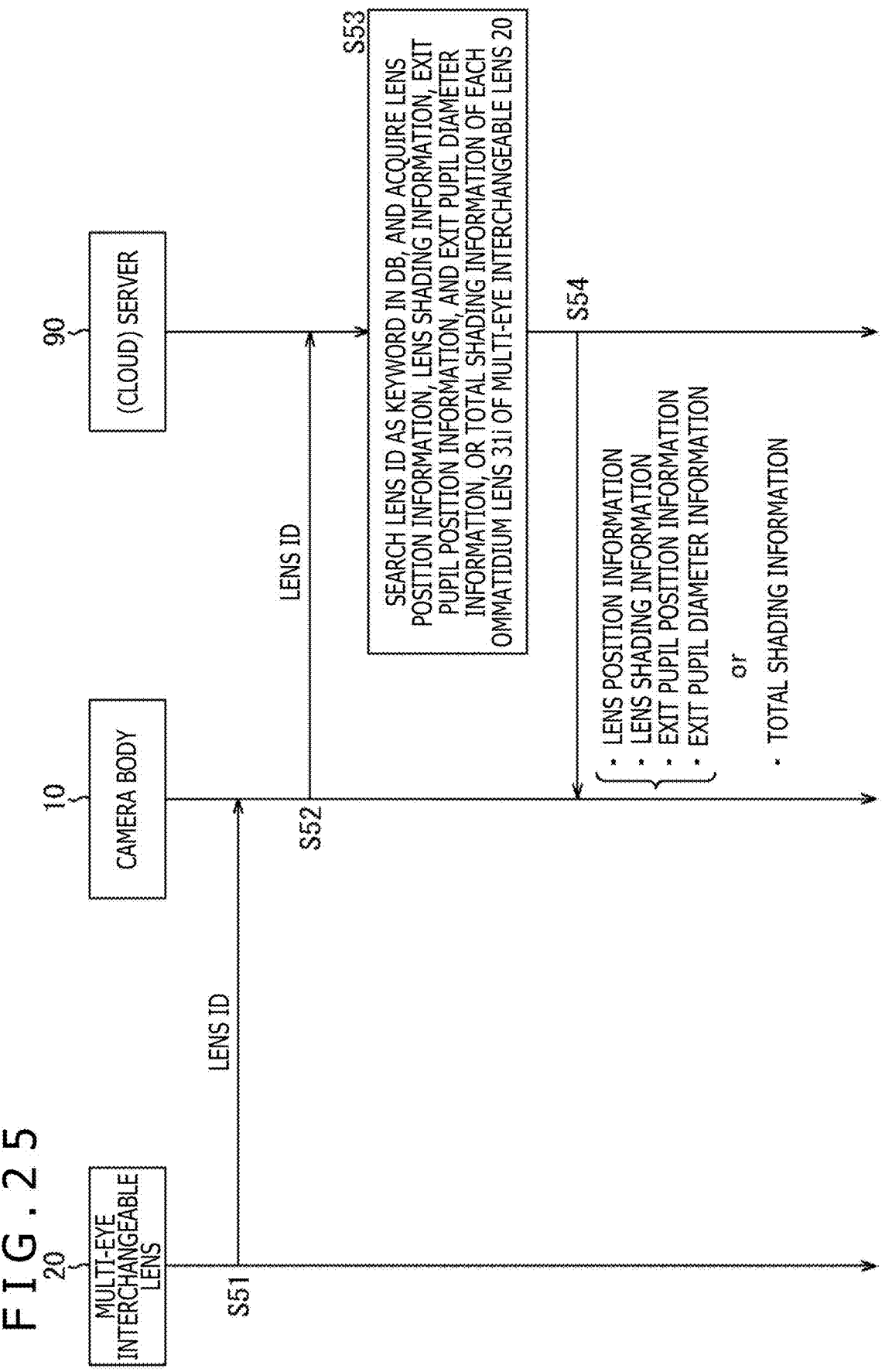
FIG. 25 is a diagram explaining an example of a process for acquiring lens position information, lens shading information, exit pupil position information, and exit pupil diameter information, or total shading information using a server.

FIG. 25 is a diagram explaining an example of a process for acquiring lens position information, lens shading information, exit pupil position information, and exit pupil diameter information, or total shading information using a server.

In addition, it is assumed that a lens ID of the multi-eye interchangeable lens 20 is adopted as the shading information in FIG. 25, and that a database is prepared in which the lens ID is associated with lens position information, lens shading information, exit pupil position information, and exit pupil diameter information, or total shading information for each of the ommatidium lenses $31_i$ of the multi-eye interchangeable lens 20 identified by the lens ID.

For example, when the multi-eye interchangeable lens 20 is fitted to the camera body 10, the communication unit 42 of the multi-eye interchangeable lens 20 (FIG. 3) transmits the lens ID to the camera body 10 as shading information stored in the storage unit 41 in step S51.

The communication unit 52 of the camera body 10 (FIG. 3) receives the lens ID from the multi-eye interchangeable lens 20, and transmits the lens ID to the server 90 in a cloud, for example, in step S52.

The server 90 receives the lens ID from the camera body 10, and searches the lens ID as a keyword in a database (DB) to acquire lens position information, lens shading information, exit pupil position information, and exit pupil diameter information, or total shading information associated with each of the ommatidium lenses $31_i$ of the multi-eye interchangeable lens 20 identified by the lens ID in step S53.

Thereafter, the server 90 transmits, to the camera body 10, the lens position information, the lens shading information, the exit pupil position information, and the exit pupil diameter information, or the total shading information associated with each of the ommatidium lenses $31_i$ of the multi-eye interchangeable lens 20 searched from the database in step S54.

In the camera body 10 (FIG. 3), the communication unit 52 receives the lens position information, the lens shading information, the exit pupil position information, and the exit pupil diameter information, or the total shading information associated with each of the ommatidium lenses $31_i$ of the multi-eye interchangeable lens 20 from the server 90, and supplies the respective pieces of information to the correction unit 53. The correction unit 53 performs shading correction of the captured image output from the image sensor 51 on the basis of the lens position information, the lens shading information, the exit pupil position information, and the exit pupil diameter information, or the total shading information included in the captured image, associated with each of the ommatidium lenses $31_i$ of the multi-eye interchangeable lens 20, and received from the server 90.

In addition, while the lens ID is transmitted from the multi-eye interchangeable lens 20 via the camera body 10 to the server 90 in FIG. 25, the lens ID is allowed to be (directly) transmitted from the multi-eye interchangeable lens 20 to the server 90 without passing through the camera body 10.

Furthermore, the camera body 10 is allowed to transmit the captured image to the server 90 together with the lens ID. In this case, the server 90 is allowed to perform shading correction of the captured image received from the camera body 10 on the basis of the lens position information, the lens shading information, the exit pupil position information, and the exit pupil diameter information, or the total shading information associated with each of the ommatidium lenses $31_i$ of the multi-eye interchangeable lens 20 searched using the lens ID as a keyword, and transmit the captured image after shading correction to the camera body 10.

Furthermore, the region identification unit 54 is allowed to be eliminated from the camera body 10, and the camera body 10 is allowed to transmit the captured image to the server 90. In this case, the server 90 is allowed to extract the ommatidium image from the captured image as necessary, and transmit the extracted ommatidium image to the camera body 10.

Besides, the image processing unit 55 is allowed to be eliminated from the camera body 10, and the camera body 10 is allowed to transmit the captured image or the ommatidium image to the server 90. In this case, the server 90 is allowed to extract the ommatidium image from the captured image as necessary, and perform image processing similar to that performed by the image processing unit 55 by using the ommatidium image extracted from the captured image or the ommatidium image transmitted from the camera body 10. Thereafter, the server 90 is allowed to transmit a processing result image obtained by the image processing to the camera body 10 or the like.

<Shading Correction Performed in Cloud>

FIG. 26 is a block diagram depicting a configuration example of a shading correction system in a case where shading correction is performed in a cloud.

The shading correction system depicted in FIG. 26 includes a camera system 101 and a cloud server 102. The camera system 101 includes a multi-eye interchangeable lens 110 fitted to a camera body 120.

The multi-eye interchangeable lens 110 includes an ommatidium lens $131_1$, an ommatidium lens $131_2$, an ommatidium lens $131_3$, an ommatidium lens $131_4$, and a lens microcomputer 141.

The ommatidium lens $131_1$, the ommatidium lens $131_2$, the ommatidium lens $131_3$, and the ommatidium lens $131_4$ of the multi-eye interchangeable lens 110 are configured similarly to the ommatidium lens $31_1$, the ommatidium lens $31_2$, the ommatidium lens $31_3$, and the ommatidium lens $31_4$ of the multi-eye interchangeable lens 20 depicted in FIG. 3. The lens microcomputer 141 stores a lens ID as shading information.

The camera body 120 includes an image sensor 151, a camera signal processing LSI (large-scale integrated circuit) 152, a body microcomputer 153, and a storage unit 154.

The image sensor 151 is configured similarly to the image sensor 51 of the camera body 10 depicted in FIG. 3.

A captured image is supplied to the camera signal processing LSI 152 from the image sensor 151. The camera signal processing LSI 152 performs necessary signal processing such as development for the captured image received from the image sensor 151, and supplies the processed captured image to the body microcomputer 153.

When the multi-eye interchangeable lens 110 is fitted to the camera body 120, the body microcomputer 153 performs wired or wireless communication with the lens microcomputer 141 (body lens communication) to receive the lens ID as shading information from the lens microcomputer 141. Thereafter, the body microcomputer 153 transmits the lens ID received from the lens microcomputer 141 to the cloud server 102 in a cloud via a network such as the Internet together with the captured image received from the camera signal processing LSI 152.

The cloud server 102 includes a cloud CPU (Central Processing Unit) 171, a shading database 172, a correction unit 173, and a storage unit 174.

The cloud CPU 171 receives the lens ID and the captured image transmitted from the body microcomputer 153. The cloud CPU 171 searches total shading information (or shading information) in the shading database 172 using the lens ID received from the body microcomputer 153 as a keyword, and supplies the total shading information (or the shading information) to the correction unit 173 together with the captured image received from the body microcomputer 153.

Accordingly, the shading database 172 stores the lens ID, and the total shading information (or the shading information) corresponding to the multi-eye interchangeable lens identified by the lens ID in association with each other. The cloud CPU 171 searches the total shading information associated with the lens ID received from the body microcomputer 153 in the shading database 172, and supplies the total shading information to the correction unit 173 together with the captured image received from the body microcomputer 153.

The correction unit 173 performs shading correction for correcting total shading of the captured image received from the cloud CPU 171 on the basis of the total shading information received from the same cloud CPU 171 in a manner similar to the manner of the correction unit 53 in FIG. 3. The correction unit 173 supplies the captured image after shading correction to the cloud CPU 171.

The cloud CPU 171 supplies the captured image obtained after shading correction and received from the correction unit 173 to the storage unit 174, and stores the captured image in the storage unit 174.

Alternatively, the cloud CPU 171 transmits the captured image after shading correction to the body microcomputer 153 of the camera body 120 via the Internet.

The body microcomputer 153 receives the captured image after shading correction from the cloud CPU 171, and stores the received captured image in the storage unit 154 which is a SD (Secure Digital) card or the like and attachable to and detachable from the camera body 120, for example.

<Description of Computer to which Present Technology is Applied>

Furthermore, a series of processes of the communication unit 52, the region identification unit 54, the image processing unit 55, and the like described above may be performed either by hardware or by software. In a case where the series of processes are performed by software, a program constituting the software is installed into a general-purpose computer or the like.

FIG. 27 is a block diagram depicting a configuration example of a computer into which a program executing the above-described series of processes is installed according to one embodiment.

The program may be recorded beforehand in a hard disk 205 or a ROM 203 as recording media built-in the computer.

Alternatively, the program may be stored (recorded) in a removable recording medium 211. The removable recording medium 211 described above may be provided as what is generally called package software. Examples of the removable recording medium 211 here include a flexible disk, a CD-ROM (Compact Disc Read Only Memory), an MO (Magneto Optical) disk, a DVD (Digital Versatile Disc), a magnetic disk, and a semiconductor memory.

Note that the program is allowed to be installed into the computer from the removable recording medium 211 described above, or allowed to be downloaded into the computer via a communication network or a broadcasting network, and installed into the built-in hard disk 205. More specifically, for example, the program is allowed to be wirelessly transferred from a download site to the computer via an artificial satellite for digital satellite broadcasting, or transferred to the computer by wired via a network such as a LAN (Local Area Network) and the Internet.

The computer includes a CPU (Central Processing Unit) 202 as a built-in unit. An input/output interface 210 is connected to the CPU 202 via a bus 201.

When a command is input to the CPU 202 from the user via the input/output interface 210 by an operation through an input unit 207, for example, the CPU 202 executes the program stored in the ROM (Read Only Memory) 203 in response to this command. Alternatively, the CPU 202 loads the program stored in the hard disk 205 into a RAM (Random Access Memory) 204, and executes the program.

In this manner, the CPU 202 performs a process in accordance with the flowchart described above, or a process executed by the above configuration depicted in the block diagram. Thereafter, the CPU 202 outputs a processing result from an output unit 206, transmits the processing result from the communication unit 208, records the processing result in the hard disk 205, or performs other processing as necessary via the input/output interface 210, for example.

Note that the input unit 207 includes a keyboard, a mouse, a microphone, and the like. In addition, the output unit 206 includes an LCD (Liquid Crystal Display), a speaker, and the like.

In the present description, the process performed by the computer under the program here is not necessarily required to be executed in time series in the order described in the flowchart. Accordingly, the process performed by the computer under the program includes a process executed in parallel or individually (e.g., a parallel process or a process performed by an object).

Moreover, the program may be processed by one computer (processor), or may be distributed to and executed by a plurality of computers. Furthermore, the program may be transferred to and executed by a remote computer.

In addition, in the present description, the system refers to an aggregation of a plurality of constituent elements (apparatuses, modules (parts) or the like). It does not matter whether or not all the constituent elements are contained in an identical housing. Accordingly, a plurality of apparatuses stored in separate housings and connected to each other via a network, and one apparatus accommodating a plurality of modules in one housing are both systems.

Note that embodiments of the present technology are not limited to the embodiment described above, but may be modified in various manners without departing from the subject matters of the present technology.

For example, the present technology is allowed to have a configuration of cloud computing configured such that one function is shared and performed by a plurality of apparatuses via a network, and processed by the apparatuses in cooperation with each other.

Moreover, the respective steps described with reference to the above flowcharts may be either executed by one apparatus or may be shared and executed by a plurality of apparatuses.

Furthermore, in a case where one step includes a plurality of processes, the plurality of processes included in the one step may be executed by one apparatus, or may be shared and executed by a plurality of apparatuses.

In addition, advantageous effects described in the present description are presented only by way of example. Other advantageous effects may be offered.

Note that the present technology is allowed to have following configurations.

<1>
An information processing apparatus including:
a communication unit that receives shading information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor; and
a correction unit that corrects shading of each of the plurality of ommatidium images that are included in the captured image acquired by the image sensor and respectively correspond to the plurality of ommatidium lenses on the basis of the shading information.

<2>
The information processing apparatus according to <1>, in which
the shading information includes total shading information associated with total shading that is shading caused by the interchangeable lens and a predetermined image sensor.

<3>
The information processing apparatus according to <2>, in which
the total shading information is an image capturing a predetermined object and acquired by the interchangeable lens.

<4>
The information processing apparatus according to <3>, in which
the predetermined object reflected in the image is an object that has one color and no pattern.

<5>
The information processing apparatus according to <1>, in which
the shading information includes lens position information indicating respective positions of the plurality of ommatidium lenses, lens shading information associated with lens shading that is shading caused by each of the plurality of ommatidium lenses, exit pupil position information indicating respective positions of exit pupils of the plurality of ommatidium lenses, and exit pupil diameter information indicating respective diameters of the exit pupils of the plurality of ommatidium lenses.

<6>
The information processing apparatus according to <5>, in which
the correction unit obtains total shading information associated with total shading that is shading caused by the interchangeable lens and the image sensor from the shading information and sensor shading information associated with sensor shading that is shading caused by the image sensor, and
the correction unit corrects total shading caused by each of the plurality of ommatidium images included in the captured image on the basis of the total shading information.

<7>
The information processing apparatus according to <6>, in which
the sensor shading information includes color shading information associated with shading corresponding to each of a plurality of colors and caused by the image sensor.

<8>
The information processing apparatus according to <1>, in which
the shading information includes a unique ID (IDentification) indicating the interchangeable lens and associated with total shading information indicating total shading that is shading caused by the interchangeable lens and a predetermined image sensor.

<9>
The information processing apparatus according to <1>, in which
the shading information includes a unique ID (IDentification) indicating the interchangeable lens and associated with lens position information indicating respective positions of the plurality of ommatidium lenses, lens shading information associated with lens shading that is shading caused by each of the plurality of ommatidium lenses, exit pupil position information indicating respective positions of exit pupils of the plurality of ommatidium lenses, and exit pupil diameter information indicating respective diameters of the exit pupils of the plurality of ommatidium lenses.

<10>
An information processing method performed by an information processing apparatus, the information processing method including:
receiving shading information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor; and
correcting shading of each of the plurality of ommatidium images that are included in the captured image acquired by the image sensor and respectively correspond to the plurality of ommatidium lenses on the basis of the shading information.

<11>
A program for causing a computer to function as:
a communication unit that receives shading information associated with shading of each of a plurality of ommatidium images that are included in a captured image acquired by one image sensor and correspond to images formed by lights respectively concentrated by a plurality of ommatidium lenses that are a plurality of lenses so disposed as not to overlap with each other in an optical axis direction and are included in an interchangeable lens when the interchangeable lens is fitted to a camera body including the image sensor; and
a correction unit that corrects shading of each of the plurality of ommatidium images that are included in the captured image acquired by the image sensor and respectively correspond to the plurality of ommatidium lenses on the basis of the shading information.

<12>
An interchangeable lens including:
ommatidium lenses that are a plurality of lenses so disposed as not to overlap with each other in an optical axis direction;
a storage unit that stores shading information associated with shading of each of a plurality of ommatidium images that are included in a captured image acquired by one image sensor and correspond to images formed by lights respectively concentrated by the plurality of ommatidium lenses at a time of fitting to a camera body including the image sensor; and
a communication unit that transmits the shading information to an outside.

<13>
The interchangeable lens according to <12>, in which the shading information includes total shading information associated with total shading that is shading caused by the interchangeable lens and a predetermined image sensor.

<14>
The interchangeable lens according to <13>, in which the total shading information is an image capturing a predetermined object and acquired by the interchangeable lens.

<15>
The interchangeable lens according to <14>, in which the predetermined object reflected in the image is an object that has one color and no pattern.

<16>
The interchangeable lens according to <12>, in which the shading information includes lens position information indicating respective positions of the plurality of ommatidium lenses, lens shading information associated lens shading that is shading caused by each of the plurality of ommatidium lenses, exit pupil position information indicating respective positions of exit pupils of the plurality of ommatidium lenses, and exit pupil diameter information indicating respective diameters of the exit pupils of the plurality of ommatidium lenses.

<17>
The interchangeable lens according to <12>, in which the shading information includes a unique ID (IDentification) indicating the interchangeable lens and associated with total shading information indicating total shading that is shading caused by the interchangeable lens and a predetermined image sensor.

<18>
The interchangeable lens according to <12>, in which the shading information includes a unique ID (IDentification) indicating the interchangeable lens and associated with lens position information indicating respective positions of the plurality of ommatidium lenses, lens shading information associated with lens shading that is shading caused by each of the plurality of ommatidium lenses, exit pupil position information indicating respective positions of exit pupils of the plurality of ommatidium lenses, and exit pupil diameter information indicating respective diameters of the exit pupils of the plurality of ommatidium lenses.

REFERENCE SIGNS LIST

10 Camera body, 11 Camera mount, 20 Multi-eye interchangeable lens, 21 Lens barrel, 22 Lens mount, 31$_1$ to 31$_7$ Ommatidium lens, 41 Storage unit, 42 Communication unit, 51 Image sensor, 52 Communication unit, 53 Correction unit, 54 Region identification unit, 55 Image processing unit, 56 Display unit, 57 Storage unit, 81 Disparity information generation unit, 82 Interpolation unit, 83 Concentration processing unit, 84 Parameter setting unit, 90 Server, 101 Camera system, 102 Cloud server, 110 Multi-eye interchangeable lens, 120 Camera body, 131$_1$ to 131$_4$ Ommatidium lens, 141 Lens microcomputer, 151 Image sensor, 152 Camera signal processing LSI, 153 Body microcomputer, 154 Storage unit, 171 Cloud CPU, 172 Shading database, 173 Correction unit, 174 Storage unit, 201 bus, 202 CPU, 203 ROM, 204 RAM, 205 Hard disk, 206 Output unit, 207 Input unit, 208 Communication unit, 209 Drive, 210 Input/output interface, 211 Removable medium

The invention claimed is:

1. An information processing apparatus comprising:
circuitry configured to:
receive shading information of ommatidium images of respective ommatidium lenses of an interchangeable lens assembly, wherein
the ommatidium lenses are disposed as not to overlap with each other in a two-dimensional plane, and
the two-dimensional plane is a plane parallel to an image sensor included in a camera body in a state where the interchangeable lens assembly is fitted to the camera body;
control, in the state where the interchangeable lens assembly is fitted to the camera body, the image sensor to acquire one captured image including a plurality of the ommatidium images; and
correct, on a basis of the shading information, shading of the plurality of ommatidium images,
wherein the shading information includes
lens position information indicating respective positions of the ommatidium lenses in the two-dimensional plane,
lens shading information associated with shading caused by each of the ommatidium lenses,
exit pupil position information indicating respective positions of exit pupils of the ommatidium lenses, and
exit pupil diameter information indicating respective diameters of the exit pupils of the ommatidium lenses.

2. The information processing apparatus according to claim 1, wherein
the circuitry is further configured to:
determine, on a basis of the shading information and sensor shading information, total shading information associated with total shading that is shading caused by the interchangeable lens assembly and the image sensor; and
correct total shading caused by each of the ommatidium images on a basis of the total shading information, and
the sensor shading information is associated with sensor shading that is shading caused by the image sensor.

3. The information processing apparatus according to claim 2, wherein
the sensor shading information includes color shading information associated with color shading of each of colors caused by the image sensor.

4. An information processing apparatus comprising:
circuitry configured to:
receive shading information of ommatidium images of respective ommatidium lenses of an interchangeable lens assembly, wherein
the ommatidium lenses are disposed as not to overlap with each other in a two-dimensional plane, and
the two-dimensional plane is a plane parallel to an image sensor included in a camera body in a state where the interchangeable lens assembly is fitted to the camera body;
control, in the state where the interchangeable lens assembly is fitted to the camera body, the image sensor to acquire one captured image including a plurality of the ommatidium images; and
correct, on a basis of the shading information, shading of the plurality of ommatidium images,
wherein the shading information includes a unique ID (IDentification) of the interchangeable lens assembly, and wherein the unique ID (IDentification) is associated with
lens position information indicating respective positions of the ommatidium lenses,
lens shading information associated with lens shading caused by each of the ommatidium lenses,
exit pupil position information indicating respective positions of exit pupils of the ommatidium lenses, and
exit pupil diameter information indicating respective diameters of the exit pupils of the ommatidium lenses.

5. An interchangeable lens comprising:
ommatidium lenses that are a plurality of lenses so disposed as not to overlap with each other in an optical axis direction; and
circuitry configured to:
store shading information of respective ommatidium images of an interchangeable lens assembly, wherein the ommatidium lenses are disposed as not to overlap with each other in a two-dimensional plane, and the two-dimensional plane is a plane parallel to an image sensor included in a camera body in a state where the interchangeable lens assembly is fitted to the camera body; and
transmit the shading information to an outside,
wherein the shading information includes
lens position information indicating respective positions of the ommatidium lenses in the two-dimensional plane,
lens shading information associated with shading caused by each of the ommatidium lenses,
exit pupil position information indicating respective positions of exit pupils of the ommatidium lenses, and
exit pupil diameter information indicating respective diameters of the exit pupils of the ommatidium lenses.

6. An information processing method comprising:
receiving shading information of ommatidium images of respective ommatidium lenses of an interchangeable lens assembly, wherein
the ommatidium lenses are disposed as not to overlap with each other in a two-dimensional plane, and
the two-dimensional plane is a plane parallel to an image sensor included in a camera body in a state where the interchangeable lens assembly is fitted to the camera body;
controlling, in the state where the interchangeable lens assembly is fitted to the camera body, the image sensor to acquire one captured image including a plurality of the ommatidium images; and
correcting, on a basis of the shading information, shading of the plurality of ommatidium images,
wherein the shading information includes
lens position information indicating respective positions of the ommatidium lenses in the two-dimensional plane,
lens shading information associated with shading caused by each of the ommatidium lenses,
exit pupil position information indicating respective positions of exit pupils of the ommatidium lenses, and
exit pupil diameter information indicating respective diameters of the exit pupils of the ommatidium lenses.

7. An information processing method comprising:
receiving shading information of ommatidium images of respective ommatidium lenses of an interchangeable lens assembly, wherein
the ommatidium lenses are disposed as not to overlap with each other in a two-dimensional plane, and
the two-dimensional plane is a plane parallel to an image sensor included in a camera body in a state where the interchangeable lens assembly is fitted to the camera body;
controlling, in the state where the interchangeable lens assembly is fitted to the camera body, the image sensor to acquire one captured image including a plurality of the ommatidium images; and
correcting, on a basis of the shading information, shading of the plurality of ommatidium images,
wherein the shading information includes a unique ID (IDentification) of the interchangeable lens assembly, and
wherein the unique ID (IDentification) is associated with
lens position information indicating respective positions of the ommatidium lenses,
lens shading information associated with lens shading caused by each of the ommatidium lenses,
exit pupil position information indicating respective positions of exit pupils of the ommatidium lenses, and
exit pupil diameter information indicating respective diameters of the exit pupils of the ommatidium lenses.

* * * * *